US009641529B2

(12) United States Patent
Kovacs et al.

(10) Patent No.: US 9,641,529 B2
(45) Date of Patent: May 2, 2017

(54) METHODS, SYSTEMS AND COMPUTER PROGRAM PRODUCTS FOR AN APPLICATION EXECUTION CONTAINER FOR MANAGING SECONDARY APPLICATION PROTOCOLS

(71) Applicant: Coastal Federal Credit Union, Raleigh, NC (US)

(72) Inventors: Kristopher S. Kovacs, Fuquay Varina, NC (US); David Faleski, Rolesville, NC (US); Brandon Kunz, Cumming, GA (US); Charles M. Purvis, Raleigh, NC (US); John Patrick O'Shaughnessy, Marlborough (GB)

(73) Assignee: Coastal Federal Credit Union, Raleigh, NC (US)

( * ) Notice: Subject to any disclaimer, the term of this patent is extended or adjusted under 35 U.S.C. 154(b) by 64 days.

(21) Appl. No.: 14/937,078

(22) Filed: Nov. 10, 2015

(65) Prior Publication Data
US 2016/0134596 A1    May 12, 2016

Related U.S. Application Data

(60) Provisional application No. 62/077,532, filed on Nov. 10, 2014.

(51) Int. Cl.
*H04L 29/06* (2006.01)
*G06F 21/62* (2013.01)
(Continued)

(52) U.S. Cl.
CPC ...... *H04L 63/0876* (2013.01); *G06F 21/6281* (2013.01); *H04W 12/06* (2013.01); *H04W 12/08* (2013.01)

(58) Field of Classification Search
CPC ............ H04L 63/0428; H04L 63/0876; G06F 21/6281; H04W 12/08; H04W 12/06
See application file for complete search history.

(56) References Cited

U.S. PATENT DOCUMENTS

| 7,975,287 B2 * | 7/2011 | Hung | ........... G06F 21/335 709/225 |
| 2004/0218609 A1 * | 11/2004 | Foster | ........... H04L 12/5692 370/401 |

(Continued)

OTHER PUBLICATIONS

Kwiatkowski, Alex "Best Practices: Credit Agricole Innovates with Its New CA Store", IDC Financial Insight: European Banking IT Strategies, Jun. 2013, 9 Pages.

(Continued)

*Primary Examiner* — Mohammad A Siddiqi
(74) *Attorney, Agent, or Firm* — Myers Bigel, P.A.

(57) ABSTRACT

A virtual application container can manage a plurality of secondary applications using a graphical user interface (GUI). The secondary applications may be selectively downloadable by a user and/or provided by third-party external providers. The application execution container may include a common feature or services interface that is used by the secondary applications that are executed in the GUI, which may include user verification and/or authentication information. The application execution container may include security and control functions that may be used by external service providers to ensure that users are properly authenticated, and the ability to add and/or utilize individual secondary applications may be granted based on predetermined eligibility criteria.

27 Claims, 12 Drawing Sheets

(51) Int. Cl.
*H04W 12/06* (2009.01)
*H04W 12/08* (2009.01)

(56) References Cited

U.S. PATENT DOCUMENTS

| | | | | | |
|---|---|---|---|---|---|
| 2007/0244811 | A1* | 10/2007 | Tumminaro | ........... | G06Q 20/10 705/39 |
| 2009/0172795 | A1* | 7/2009 | Ritari | ................. | H04L 63/0815 726/7 |
| 2012/0198491 | A1* | 8/2012 | O'Connell | .............. | G06F 21/55 725/30 |
| 2012/0231844 | A1* | 9/2012 | Coppinger | ......... | G06Q 20/3278 455/558 |
| 2012/0240211 | A1* | 9/2012 | Counterman | ........... | H04L 9/321 726/9 |
| 2013/0227291 | A1* | 8/2013 | Ahmed | ............... | H04L 63/0281 713/171 |
| 2015/0302388 | A1* | 10/2015 | Seidman | ............ | G06Q 20/3224 705/26.7 |

OTHER PUBLICATIONS

Yodlee Interactive Developer Portal, Platform Overview, Retrieved from the internet on May 5, 2016 at URL https://developer.yodlee.com/Adgregation_API/Platform_Overview.

* cited by examiner

METHODS, SYSTEMS AND COMPUTER PROGRAM PRODUCTS FOR AN APPLICATION EXECUTION CONTAINER FOR MANAGING SECONDARY APPLICATION PROTOCOLS

CROSS-REFERENCE TO RELATED APPLICATION

The present application claims priority under 35 U.S.C. §119(e) to U.S. Provisional Patent Application Ser. No. 62/077,532, filed Nov. 10, 2014, the content of which is incorporated herein by reference as if set forth in its entirety.

FIELD OF THE INVENTION

The present inventive concepts relate to methods, systems and computer program products for an application container for managing application protocols, and in particular to an application container for consolidating user verification, information sharing, and application management.

BACKGROUND

Networked software allows users to conduct certain transactions electronically. Users may access a secure server over a network or download software provided by a third-party provider so that they can perform secure transactions or access other services. Some of these transactions and services may be provided on smart phones or tablet computer environments for mobile environments. While these computer environments offer convenience and mobility to users conducting secure transactions, the transaction themselves require additional security to verify the identity of the user. Current software implementations, however, are generally limited in functionality.

SUMMARY

Embodiments of the inventive concepts provide an application execution container which may include a common interface that is used by the secondary applications that are executed within the container. The common interface may include user verification and/or authentication information. The application execution container may include security and control functions that may be used by external service providers to ensure that users are properly authenticated, and the ability to add and/or utilize individual secondary applications may be granted based on predetermined eligibility criteria.

In accordance with aspects of the inventive concepts, a computer-implemented method may include displaying, on a computing device, an application execution container configured to provide an execution environment to execute secondary applications within the application execution container, providing, by the application execution container, a secure network connection over a computer network between the secondary applications and an application gateway node, retrieving, by the application execution container, a plurality of secondary applications from the application gateway node over the secure network connection, executing, within the application execution container and responsive to selection by a user of the application execution container, one of the plurality of retrieved secondary applications, restricting, by the application execution container, all network communications by the executed secondary application to the secure network connection between the application execution container and the application gateway node, providing, by the application execution container, an authentication interface to authenticate the user of the application execution container to the application gateway node over the secure network connection to allow the executed secondary application access to the application gateway node, and transforming, by the application execution container, a request for services from the application gateway node by the executed secondary application into an authenticated request to the application gateway node by using the provided authentication interface. The authentication interface may authenticate the user of the application execution container to the application gateway node by providing secure authentication information of the user of the application execution container to the application gateway node without providing the secure authentication information of the user of the application execution container to the executed secondary application.

In some embodiments, the plurality of secondary applications may be configured so as to execute only within the application execution container.

In some embodiments, retrieving the plurality of secondary applications from the application gateway node may include selecting secondary applications for retrieval based on selection criteria associated with the user of the application execution container.

In some embodiments, the selection criteria may include selecting secondary applications based on services provided to the user of the application execution container by an external services provider.

In some embodiments, the computer implemented method may further include creating a record of authenticated transactions between respective ones of the secondary applications executing within the application execution container and the application gateway node. The record may be stored in a non-transitory storage medium.

In some embodiments, the application execution container may execute within an operating system of a personal computing device.

In some embodiments, the personal computing device may be a phone.

In some embodiments, providing, by the application execution container, an authentication interface may include providing a computing interface configured to exchange data between the executed secondary application and the application gateway node, over the secure network connection, and configured to support two-factor authentication with the application gateway node.

In some embodiments, the authentication interface may require the two-factor authentication responsive to selected transactions initiated by the executed secondary application.

In some embodiments, the computer-implemented method may further include providing, by the application execution container, a data exchange interface configured to exchange data between a first executed secondary application and a second executed secondary application.

In some embodiments, an access to services provided by an external services provider may be restricted responsive to a level of service allowed to the user of the application execution container.

In some embodiments, an access to services provided by the external services provider to the executed secondary application may be further restricted responsive to a level of service allowed to the executed secondary application.

In some embodiments, the computer-implemented method may further include receiving, by the application gateway node, an external connector module from an external services provider, providing, by the application gateway node, a secure network connection between the application gateway node and the external services provider, receiving a request, at the application gateway node from the executed secondary application, for the executed secondary application to communicate with the external services provider, and routing the request, by the application gateway node, from the executed secondary application to the external services provider through the external connector module. The external connector module may be configured to communicate data between the application gateway node and the external services provider.

In some embodiments, the secure authentication information of the user may be provided in the application execution container within an encrypted object. The encrypted object may be encrypted so that the executed secondary application and the application execution container cannot decrypt the secure authentication information of the user.

In some embodiments, respective ones of the plurality of the secondary applications retrieved from the application gateway node may be coded in HTML and/or JavaScript®.

In some embodiments, the retrieved plurality of secondary applications are stored and executed only from within a volatile storage medium on the computing device.

In some embodiments, the authentication interface may include a common set of procedures and/or objects managed by the application execution container and shared among the retrieved secondary applications.

In accordance with aspects of the inventive concepts, a system may include a processor and a memory coupled to the processor. The memory may include computer readable program code embodied in the memory that when executed by the processor causes the processor to perform operations including displaying, on the system, an application execution container configured to provide an execution environment to execute secondary applications within the application execution container, providing, by the application execution container, a secure network connection over a computer network between the secondary applications and an application gateway node, retrieving, by the application execution container, a plurality of secondary applications from the application gateway node over the secure network connection, executing, within the application execution container and responsive to selection by a user of the application execution container, one of the plurality of retrieved secondary applications, restricting, by the application execution container, all network communications by the executed secondary application to the secure network connection between the application execution container and the application gateway node, providing, by the application execution container, an authentication interface to authenticate the user of the application execution container to the application gateway node over the secure network connection to allow the executed secondary application access to the application gateway node, and transforming, by the application execution container, a request for services from the application gateway node by the executed secondary application into an authenticated request to the application gateway node by using the provided authentication interface. The authentication interface may authenticate the user of the application execution container to the application gateway node by providing secure authentication information of the user of the application execution container to the application gateway node without providing the secure authentication information of the user of the application execution container to the executed secondary application.

In some embodiments, the plurality of secondary applications may be configured so as to execute only within the application execution container.

In some embodiments, retrieving the plurality of secondary applications from the application gateway node may include selecting secondary applications for retrieval based on selection criteria associated with the user of the application execution container.

In some embodiments, the selection criteria may include selecting secondary applications based on services provided to the user of the application execution container by an external services provider.

In some embodiments, providing, by the application execution container, an authentication interface may include providing a computing interface configured to exchange data between the executed secondary application and the external services provider, over the secure network connection, and configured to support two-factor authentication with the external services provider.

In some embodiments, the authentication interface requires the two-factor authentication responsive to selected transactions initiated by the executed secondary application.

In accordance with aspects of the inventive concepts, a system may include a processor and a memory coupled to the processor. The memory may include computer readable program code embodied in the memory that when executed by the processor causes the processor to perform operations including receiving, on the system, a request from an application execution container configured to provide a secure network connection over a computer network between the system and the application execution container, receiving, over the secure network connection between the system and the application execution container, user authentication information associated with a user of the application execution container, providing the received user authentication information to an authentication and privileges engine, receiving from the authentication and privileges engine a plurality of entitlements associated with the user of the application execution container, responsive to receiving the entitlements of the user associated with the application execution container, determining a plurality of entitled secondary applications which the entitlements of the user indicate are available for the user, receiving, over the secure network connection between the system and the application execution container, a first request for a user interface portion of a respective one of the plurality of entitled applications, and providing, responsive to the first request, the user interface portion of the respective one of the plurality of the entitled secondary applications over the secure network connection to the application execution container, receiving, over the secure network connection between the system and the application execution container, a second request for a functional portion of the respective one of the plurality of entitled applications, and providing, responsive to the second request, the functional portion of the respective one of the plurality of the entitled secondary applications over the secure network connection to the application execution container. The authentication and privileges engine may be configured to associate the user authentication information with entitlements available to the user. Respective ones of the plurality of entitled applications may include a user interface portion and a functional portion.

In accordance with aspects of the inventive concepts, a computer program product may include a non-transitory computer readable storage medium having computer readable program code embodied in the medium that when executed by a processor causes the processor to perform operations which may include displaying, on a computing device, an application execution container configured to provide an execution environment to execute secondary applications within the application execution container, providing, by the application execution container, a secure network connection over a computer network between the secondary applications and an application gateway node, retrieving, by the application execution container, a plurality of secondary applications from the application gateway node over the secure network connection, executing, within the application execution container and responsive to selection by a user of the application execution container, one of the plurality of retrieved secondary applications, restricting, by the application execution container, all network communications by the executed secondary application to the secure network connection between the application execution container and the application gateway node, providing, by the application execution container, an authentication interface to authenticate the user of the application execution container to the application gateway node over the secure network connection to allow the executed secondary application access to the application gateway node, and transforming, by the application execution container, a request for services from the application gateway node by the executed secondary application into an authenticated request to the application gateway node by using the provided authentication interface. The authentication interface may authenticate the user of the application execution container to the application gateway node by providing secure authentication information of the user of the application execution container to the application gateway node without providing the secure authentication information of the user of the application execution container to the executed secondary application.

In some embodiments, the plurality of secondary applications may be configured so as to execute only within the application execution container.

In some embodiments, retrieving the plurality of secondary applications from the application gateway node comprises selecting secondary applications for retrieval based on selection criteria associated with the user of the application execution container.

In some embodiments, providing, by the application execution container, an authentication interface comprises providing a computing interface configured to exchange data between the executed secondary application and the application gateway node, over the secure network connection, and configured to support two-factor authentication with the application gateway node.

BRIEF DESCRIPTION OF THE DRAWINGS

The accompanying drawings, which are incorporated in and constitute a part of the specification, illustrate embodiments of the inventive concepts and, together with the description, serve to explain principles of the inventive concepts. Like numbers refer to like elements throughout the illustrations.

DETAILED DESCRIPTION

Figure 1:
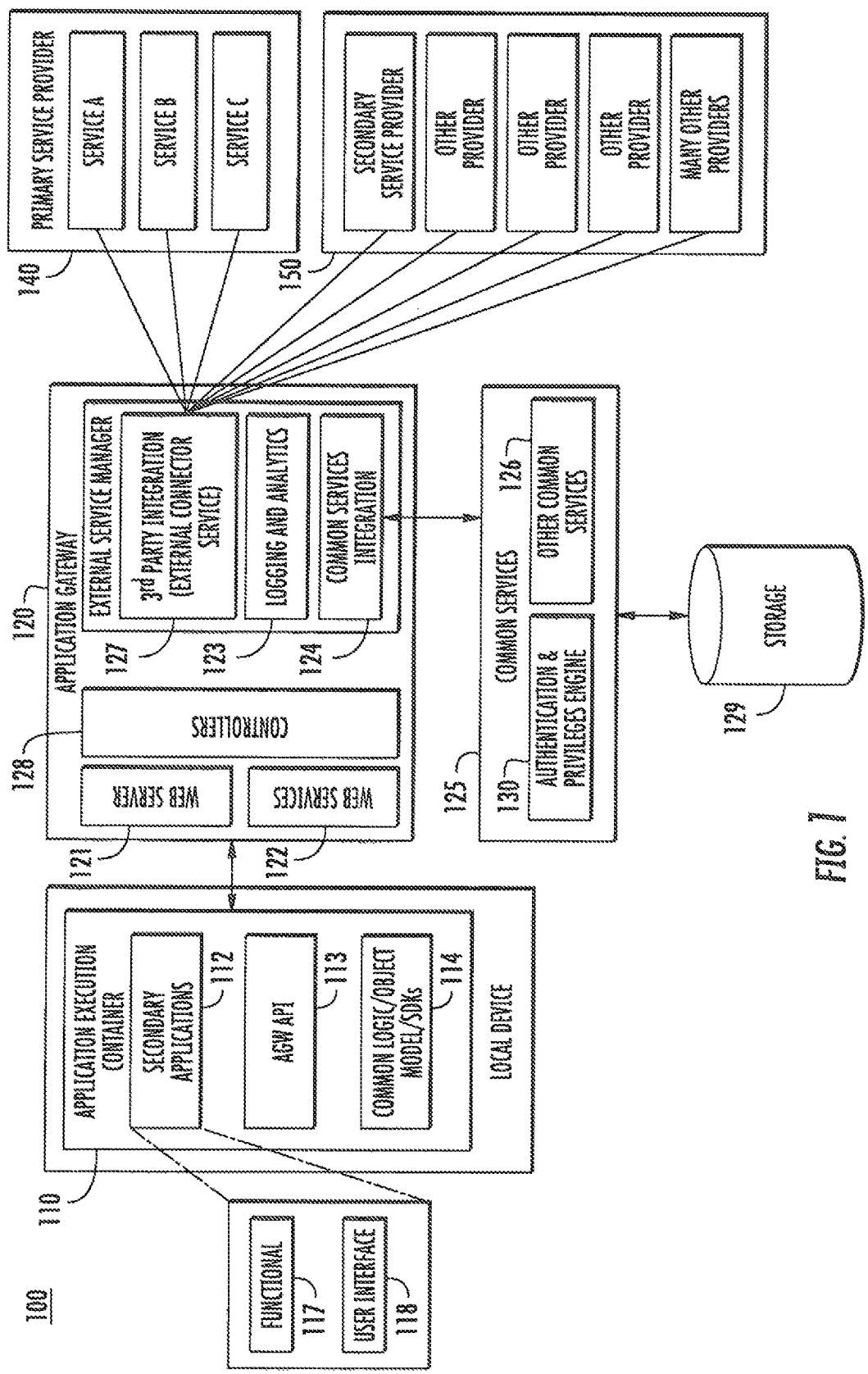
FIG. 1 is a schematic diagram of a system architecture according to some embodiments of the present inventive concepts.

The present inventive concepts now will be described hereinafter with reference to the accompanying drawings and examples, in which embodiments of the inventive concepts are shown. These inventive concepts may, however, be embodied in many different forms and should not be construed as limited to the embodiments set forth herein. Rather, these embodiments are provided so that this disclosure will be thorough and complete, and will fully convey the scope of the inventive concepts to those skilled in the art.

According to some embodiments, a virtual application container is provided that manages other applications using a graphical user interface (GUI). As used herein, the term "application execution container" refers to a computer generated software application that is configured to render a GUI and manage a plurality of secondary applications within the GUI. The secondary applications may be selectively downloadable by a user and/or provided by third-party external providers. The application execution container may include a common feature or services interface that is used by the secondary applications that are executed in the GUI, which may include user verification and/or authentication information. The application execution container may include security and control functions that may be used to ensure that users are properly authenticated, and the ability to add and/or utilize individual secondary applications may be granted based on predetermined eligibility criteria.

The eligibility criteria may be determined based on various factors, such as characteristics of the user, entitlements provided by one or more external service providers to the user and/or the secondary application the user is executing, and/or products and services being offered or subscribed to by the user, among others. Accordingly, it may be possible to control which secondary applications appear within the application execution container that are made available to a particular user or class of users. The application execution container may include both device resident and/or server side components that support rendering and branding the user interface, backend integration to the external service providers, user authentication and secondary application provisioning. The application execution container may include base features for consistency in the look and feel of the secondary applications deployed in the application execution container, such as standard look and feel definitions and style sheets as well as JavaScript® and HTML code for rendering a specific user interface.

The present inventive concepts can support the secure delivery of a broad range of services to the user of the application execution container by application developers within a single user experience on mobile, tablet, desktop and/or other devices. Further, the present inventive concepts can support secure access mechanisms that govern access from the secondary applications to data and/or external systems required to support secondary application capabilities.

The application execution container can provide a user interface for user access and can include security and control mechanisms to ensure that users are only granted the ability to utilize applications to which they are entitled. The application execution container can further restrict unauthorized access by secondary applications to data and external systems based on rules and preferences for such secondary applications. The present inventive concepts can also provide an application gateway node which can receive requests from the application execution container for access to data and external systems, can merge request payloads from the application execution container with access credentials for external systems in an authentication and privileges engine, and can route authorized requests from the secondary applications accordingly for fulfillment.

In addition, the authentication and privileges engine mechanism can maintain static user entitlements, rules for dynamic user entitlements, and/or application entitlements. Entitlements may be privileges provided to the user and/or specific applications to perform particular tasks, interact with particular systems, and/or interact with particular data. These entitlements can be enforced through multiple security layers throughout the system.

The present inventive concepts can mitigate risk through a coordinated approach that integrates the application execution container, application gateway node, and authentication and privileges engine in the support of a cohesive user experience while isolating the performance of discrete functions of secondary applications to improve the security and integrity of the overall environment.

As disclosed herein, embodiments of the present inventive concepts may result in computational efficiencies and improvements that are previously unachievable using current technologies. For example, common access to shared data from a user and/or an external service provider of the user may result in computational efficiencies for the plurality of secondary applications managed by the application execution container. In addition, functions may be more efficiently managed by the application execution container by using a shared user authentication and login protocol for all of the secondary applications managed by the application execution container.

In some embodiments, the application execution container may include computer readable program code configured to display a GUI that includes a plurality of selectively downloadable secondary applications, each of the selectively downloadable secondary applications having at least one function. The application execution container may include security and control mechanisms that authenticate users and grant access to the plurality of selectively downloadable secondary applications when eligibility criteria are met by the user, including authentication and entitlement requirements. The application execution container provides the plurality of selectively downloadable secondary applications with common access to shared data from a user, such as for services provided by external third party systems, including data retrieval and caching of user permissions, data retrieval and caching of user information with respect to the external third party services, transaction histories and other shared data across the plurality of secondary applications, and access to common services, including user communications and alerting features.

In some embodiments, a plurality of selectively downloadable secondary applications that may be provided in the application execution container may access common core integration modules, which may include authentication, entitlements (provisioning instructions), location data, image processing, messaging and alerts engines, and application purchasing.

FIG. 1 is a schematic diagram of a system architecture 100 according to some embodiments of the present inventive concepts. As illustrated in FIG. 1, the system architecture 100 can include an application execution container 110, an application gateway node 120 providing common services 125, an authentication and privileges engine 130, a primary service provider 140 and one or more secondary service providers 150.

The system architecture 100 according to some embodiments of the present inventive concepts can provide the ability to secure access to external services, data, and external systems within a configurable multi-application framework. The system architecture 100 can control user access to a broad range of digital capabilities provided by a plurality of application developers within a single user interface presented by an application execution container 110. Multiple security layers may be utilized within the system architecture 100 to provide security requirements.

One such security requirement may be that users can only access functional secondary applications 112 to which they are entitled based on static and dynamic entitlements configured by the authentication and privileges engine 130.

Another security requirement may be that functional secondary applications 112 can only access data and external systems to which they are entitled based on predetermined rules and preferences for such secondary applications 112.

Yet another security requirement may be that data used within the system architecture 100 and external systems (e.g., primary service provider 140 and/or secondary service provider 150) are protected from unauthorized access.

The application execution container 110 can provide a run-time environment for user access to a broad range of functional secondary applications 112 provided by a plurality of application developers within a single user interface. The user interface can be presented on a computing device such as a mobile telephone, a tablet computer, a wearable computer, a gaming console, a network appliance, a laptop, or a desktop computer, but the present inventive concepts are not limited thereto. The secondary applications 112 can include applications which run computer instructions within the application execution container 110 and/or access data remote from the computing device (e.g. via the world-wide web)

The secondary applications 112 may be configured to run within the application execution container 110 when selected for execution by the user. In some embodiments, the secondary applications 112 may only run within the application execution container 110.

In some embodiments, the secondary application 112 may include at least two parts: a user interface portion 118 and a functional portion 117.

The user interface portion 118 may include code which provides functionality to configure the application execution container 110 to display an icon, or tile, for the secondary application 112 within the application execution container 110. The tile may provide a visual indicator to the user that the secondary application 112 is available within the application execution container 110.

The functional portion 117 of the secondary application 112 may include code which executes the functions of the secondary application 112 as described herein. The functional portion 117 of the secondary application 112 may be downloaded separately from the user interface portion 118 of the secondary application 112.

The separation of the functional portion 117 and the user interface portion 118 of the secondary application 112 provides at least two benefits: a variable user interface based on the user and/or other indicators, and additional security for the secondary application 112.

By allowing the user interface portion 118 of the secondary application 112 to be separated from the functional portion 117, the user interface portion 118 can be swapped or changed without affecting the functional portion 117. This allows the application gateway node 120 (described with greater detail herein) to provide a varying user interface for the secondary application 112 to the user depending on various factors. These factors can include the identity of the user, the source of the secondary application 112, entitlements available to the user from the primary service provider 140 and/or a secondary service provider 150, and/or the device displaying the application execution container 110, but the present inventive concepts are not limited thereto.

Separating the functional portion 117 of the secondary application 112 also provides additional security. As will be described in more detail herein, the functional portion 117 of the secondary application 112 can be downloaded when selected by the user for execution. By leaving the functional portion 117 at a centralized location (e.g. the application gateway node 120), the functional portion 117 of the secondary application 112 is less vulnerable to attacks, modifications and/or degradation.

Referring again to FIG. 1, the user interface of the application execution container 110 may be generated dynamically based on the entitlements provided to the application execution container 110 by an application gateway node 120. The application gateway node 120 may, in turn, retrieve the entitlements from an authentication and privileges engine 130 contained within a set of common services 125 available to the application gateway node 120.

The entitlements provided by the application gateway node 120 refer to permissions which control which services, interfaces and functionalities will be available to the user of the application execution container 110. In some embodiments, entitlements may be privileges provided to the user which can control functionality available to the secondary applications 112. Entitlements may also be available for individual ones of the secondary applications 112 and can control which services, interfaces and functionalities will be available to the secondary applications 112. In some embodiments, the privileges of the authentication and privileges engine 130 may include the entitlements for the secondary applications 112. In some embodiments, the privileges of the authentication and privileges engine 130 may include additional privileges which affect additional functionality of the application execution container 110.

The application execution container 110 may generate a user interface for the user dynamically when started by the user. By generating the user interface dynamically for the user, the application execution container 110 can verify that users are not allowed to access secondary application 112 functionality to which they are not entitled by not including unentitled secondary applications 112 in the user interface presented to each individual user by the application execution container 110. In some embodiments, unentitled secondary applications 112 may be displayed by the application execution container 110 but may be marked in some way to indicate that they are inaccessible.

The application execution container 110 may also contain common logic 114 which is made available to executing secondary applications 112. The common logic 114 may include common objects which can be instantiated by the secondary applications 112 to provide functionality within the application execution container 110. The common logic 114 may also contain portions of a software development kit (SDK) which can be used to promote the development of secondary applications 112 for developers. The SDK can contain functions, header files and libraries to configure elements of the development environment to aid in the development of secondary applications 112. In some embodiments, the SDK can provide access to local device features such as a camera, file upload, GPS, accelerometer, etc.

The application execution container 110 may also include an application programming interface (API) 113 (AGW API) for interaction with the application gateway node 120. The application gateway node API 113 may perform an additional security layer within the system architecture 100, which can validate that secondary applications 112 only have access to system components to which they are entitled. The application gateway node API 113 can control access mechanisms from secondary applications 112 to data and external systems, communicating with the local computing device, and invoking other secondary applications 112 within the application execution container 110. The application gateway node API 113 can restrict secondary applications 112 from being able to call external systems directly. In some embodiments, the application gateway node API 113 can restrict secondary applications 112 from communication outside the application execution container 110. In some embodiments, the application gateway node API 113 can route all outbound traffic from the secondary applications 112 to the application gateway node 120.

The application gateway node 120 can host static worldwide web content, world-wide web services and other logic. Portions of the functional portions 117 and/or user interface portions 118 of the secondary applications 112 may include web-based functionality such as HTML, JavaScript®, and stylesheets. The web-based functionality can be provided by the application gateway node 120 via a web server 121 and web services 122 located in the application gateway node 120.

The application gateway node 120 can provide various controllers 128 to implement services on behalf of the application execution container 110. In some embodiments, the application gateway node 120 can include services dedicated to third party integration 127, which can facilitate access between the application execution container 110 and external systems. In some embodiments, the application gateway node 120 can include logging and analytics 123 which may record actions performed by a plurality of application execution containers 110.

The application gateway node 120 can receive and route communications from the application execution container 110 and can provide integration 124 with common services 125 such as the authentication and privileges engine 130. The authentication and privileges engine 130 may access storage 129 to perform services related to security and authentication. The application gateway node 120 can also provide other common services 126 which may be needed by the application execution container 110. In some embodiments, the application gateway node 120 can provide integration with external systems.

In some embodiments, the application gateway node 120 can receive requests from the application execution container 110 for access to data and external systems. In some embodiments, the application gateway node 120 can merge request payloads from the application execution container 110 with access credentials for external systems maintained in the authentication and privileges engine 130. In some embodiments, the application gateway node 120 can route authorized requests from the application execution container 110 to external systems such as a primary service provider 140, or secondary service providers 150, for fulfillment.

The primary service provider 140 may control the application gateway node 120. In other words, the application gateway node 120 may be provided by the primary service provider 120 to facilitate access to the primary service provider 140. In some embodiments, the primary service provider and the application gateway node 120 may be co-located, but the present inventive concepts are not limited thereto. In some embodiments, the primary service provider 140 may be physically or logically separate from the application gateway node 120. In some embodiments, the application gateway node 120, the common services 125 and the authentication and privileges engine 130 may be deployed in a cloud environment which can be accessed by the application execution container 110. The primary service provider 140 and/or secondary service providers 150 may be physically separate from the cloud environment of the application gateway node 120, the common services 125 and the authentication and privileges engine 130.

The secondary service provider 150 may be separate from the primary service provider 140 with which the application execution container 110 may wish to communicate. The secondary service provider 150 may be a system or virtual machine which is either logically or physically separate from other systems in the network containing the application gateway node 120. In some embodiments, the secondary service provider 150 may be part of a network which is distinct from that of the primary service provider 140. In some embodiments, the secondary service provider 150 may be under the control of a different entity than the primary service provider 140. The secondary service provider 150 may provide additional services and/or data to the application execution container 110. In some embodiments, the methods and/or data used for communicating with the secondary service provider 150 may be different than the methods and/or data used for communicating with the primary service provider 140.

In order to communicate with the primary service provider 140, the application gateway node 120 may be required to authenticate with the primary service provider 140. The authentication between the application gateway node 120 and the primary service provider 140 may be a different authentication than the authentication process between the application execution container 110 and the application gateway node 120. That is to say that the application execution container 110 may authenticate with the application gateway node 120 using authentication credentials associated with the user executing the application execution container 110, while the application gateway node 120 may authenticate with the primary service provider 140 using a separate set of credentials that may be specific to the application gateway node 120.

Though FIG. 1 shows a single application execution container 110 connected to the application gateway node 120, it will be understood that in some embodiments, the application gateway node 120 may maintain a plurality of connections to a plurality of application execution containers 110 authenticated to a plurality of users. The authentication maintained by the application gateway node 120 with the plurality of users may be separate from the authentication maintained between the application gateway node 120 and the primary service provider 140.

Though FIG. 1 shows a single application gateway node 120 between an application execution container 110 and the primary service provider 140, it will be understood that in some embodiments, there may be a plurality of application gateway nodes 120 connected to the application execution container 110. Additional application gateway nodes 120 may provide connections to additional primary service providers 140 and/or other secondary service providers 150. In some embodiments, the application execution container 110 may communicate with a plurality of application gateway nodes 120 in parallel. Such a configuration may be used for load balancing or access to additional primary service providers 140 and/or other secondary service providers 150. In some embodiments, the application execution container 110 may communicate with a plurality of application gateway nodes 120 serially, where a first application gateway node 120 communicates with a second application gateway node 120 instead of, or in addition to, a primary service provider 140 and/or other secondary service provider 150.

A request over the application gateway node API 113 between the application execution container 110 and application gateway node 120 may logically and/or physically separate the user access credentials maintained in the authentication and privileges engine 130 from the request payload. In other words, the application gateway node API 113 may be configured to only send the request payload from the application execution container 110 and require that the user access credentials be retrieved separately by the application gateway node 120 from the authentication and privileges engine 130. This separation can provide an additional security layer within the system architecture 100, by combining these elements at a later portion of the authentication process without the knowledge of the application execution container 110 or authentication and privileges engine 130. In some embodiments, the application execution container 110 may provide the user access credentials with the request payload, but the user access credentials may have been encrypted by the authentication and privileges engine 130 in such a way that the application execution container 110 cannot decrypt them and thus, cannot access them.

The application gateway node 120 may also include a logically and physically separated external connector service 127 to verify that system logic internal to the application gateway node 120 is not intermingled and/or accessible to logic created to facilitate connectivity to external systems (e.g., primary service provider 140 and/or secondary service provider 150). In other words, the mechanisms used to create a connection to a primary service provider 140 and/or a secondary service provider 150 may be provided in one functional module while methods used to request an external connection are maintained in another functional module. This may allow the application gateway node 120 to facilitate connection to different service providers by using a different functional module to create the connection while maintaining a common functional module which requests the external connection. The external connector service portion of the third party integration module 127 can support integration to secure primary service providers 140 as well as secondary service providers 150 including third party services. In some embodiments, secure primary service providers 140 can include banking services, health services, educational services, and/or military services. However, the present inventive concepts are not limited thereto.

The authentication and privileges engine 130 can maintain, for example, static user entitlements, rules for dynamic user entitlements, and application entitlements. These entitlements can be enforced through multiple security layers throughout the system architecture 100 as described further herein. For user entitlements, the authentication and privileges engine 130 can allow users to be included in one or more entitlement groups through static entitlements and/or through dynamic rules applied based on user data from backend systems such as the primary services provider 140 and/or the one or more secondary service providers 150. These entitlement groups can provide a flexible model for specifying entitlement rules and calculating entitlements in real-time.

In some embodiments, the authentication and privileges engine 130 can maintain entitlements for secondary applications 112 that govern the ability of the secondary applications 112 to access external data and/or systems (through the application gateway node 120).

In some embodiments, the authentication and privileges engine 130 can maintain entitlements for secondary applications 112 to access APIs for communicating with the local device and access mechanisms to invoke other secondary applications 112. These entitlements can combine to provide a higher level of security and eliminate or reduce the possibility of rogue secondary applications 112.

In some embodiments, the application execution container 110, the application gateway node 120, the authentication and privileges engine 130, the primary service provider 140 and the one or more secondary service providers 150 may be provided on separate computer servers, but the present inventive concepts are not limited thereto. In some embodiments, the various elements can be provided on a plurality of different computer servers. For example, in some embodiments, the application gateway node 120, the common services 125 and the authentication and privileges engine 130 may be deployed in a cloud environment comprising multiple servers which can be accessed by the application execution container 110. The primary service provider 140 and/or secondary service providers 150 may be physically separate from the cloud environment of the application gateway node 120, the common services 125 and the authentication and privileges engine 130. In some embodiments, all of the components may be on a single server. In other embodiments, the application gateway node 120, the authentication and privileges engine 130, and the primary service provider 140 may be the same server while the application execution container 110 may be on a separate computer server. The separate computer system upon which the application execution container 110 executes may be controlled by a different entity, and/or cross networks controlled by a different entity, than the entity which controls the application gateway node 120, such that authentication and additional security may be necessary.

In some embodiments, the application gateway node 120 and the authentication and privileges engine 130 may be provided on the same server. In other embodiments, the application gateway node 120 and the authentication and privileges engine 130 may be provided on the different servers. Similarly, though the application gateway node 120 is illustrated with multiple components in FIG. 1 (e.g. Web Server, External Connector Service, etc.), these components may be implemented physically all as one component or separate components. The functionality of these components may also be distributed across multiple servers, as would be understood by one of ordinary skill in the art.

Figure 2:
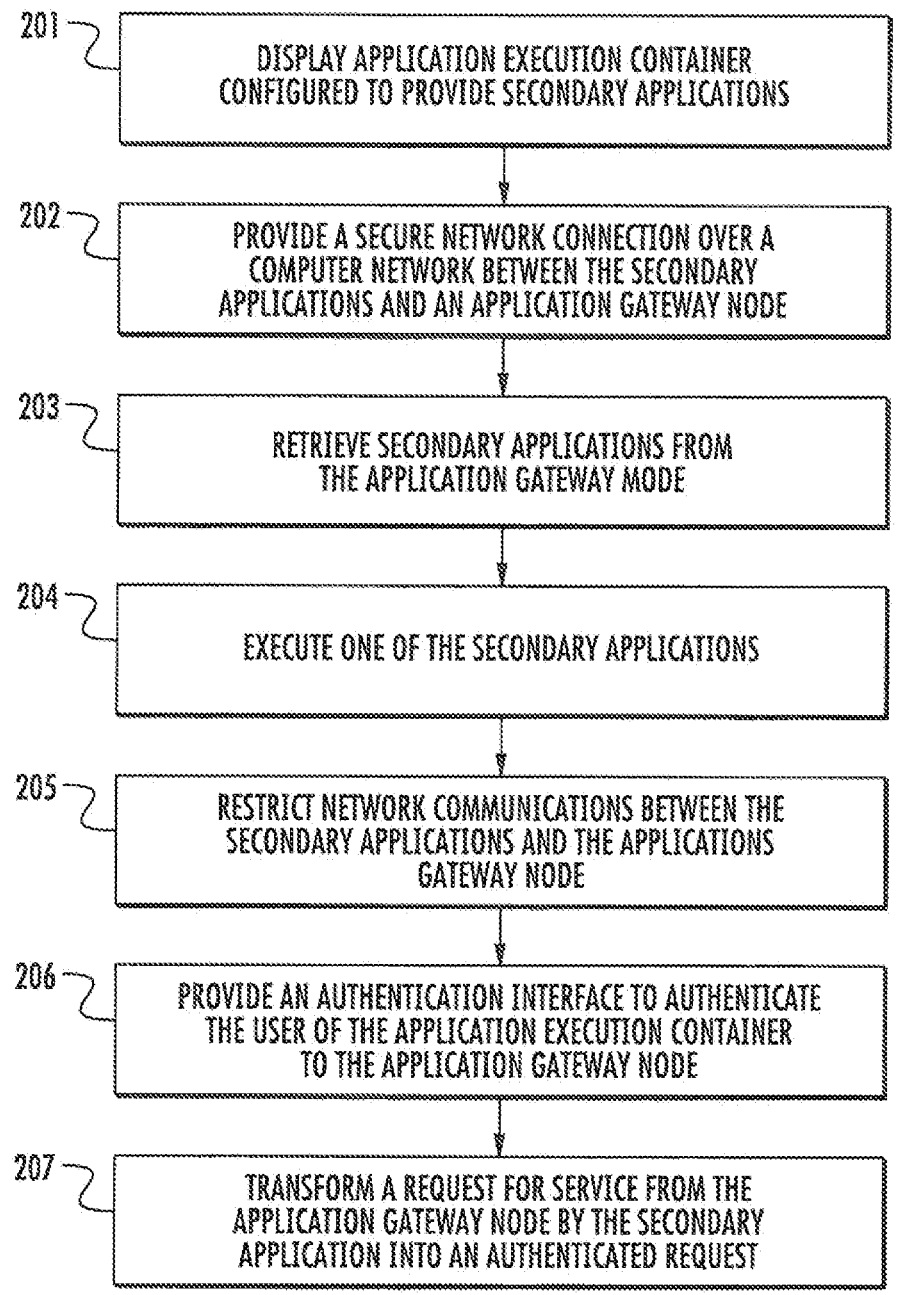
FIG. 2 is a flowchart illustrating operations of a computer-implemented method for an application execution container according to some embodiments of the present inventive concepts.

FIG. 2 is a flowchart illustrating operations of a computer implemented method for an application execution container 110 according to some embodiments of the present inventive concepts.

In some embodiments, the computer-implemented method may include a step 201 which includes displaying, on a computing device, the application execution container 110 configured to provide an execution environment to execute the secondary applications 112 within the application execution container 110.

In some embodiments, the computer-implemented method may include a step 202 providing, by the application execution container 110, a secure network connection over a computer network between the secondary applications 112 and the application gateway node 120.

In some embodiments, the computer-implemented method may include a step 203 retrieving, by the application execution container 110, a plurality of secondary applications 112 from the application gateway node 120 over the secure network connection.

In some embodiments, the computer-implemented method may include a step 204 executing, within the application execution container 110 and responsive to selection by a user of the application execution container 110, one of the plurality of retrieved secondary applications 112.

In some embodiments, the computer-implemented method may include a step 205 restricting, by the application execution container 110, all network communications by the executed secondary application 112 to the secure network connection between the application execution container 110 and the application gateway node 120 by way of the application gateway node API 113.

In some embodiments, the computer-implemented method may include a step 206 providing, by the application execution container 110, an authentication interface to authenticate the user of the application execution container 110 to the application gateway node 120 over the secure network connection to allow the executed secondary application 112 access to the application gateway node 120. The authentication interface may authenticate the user of the application execution container 110 to the application gateway node 120 by providing secure authentication information of the user of the application execution container 110 to the application gateway node 120 without providing the secure authentication information of the user of the application execution container 110 to the executed secondary application 112.

In some embodiments, the computer-implemented method may include a step 207 transforming, by the application execution container 110, a request for services from the application gateway node 120 by the executed secondary application 112 into an authenticated request to the application gateway node 120 by using the provided authentication interface.

Figure 3:
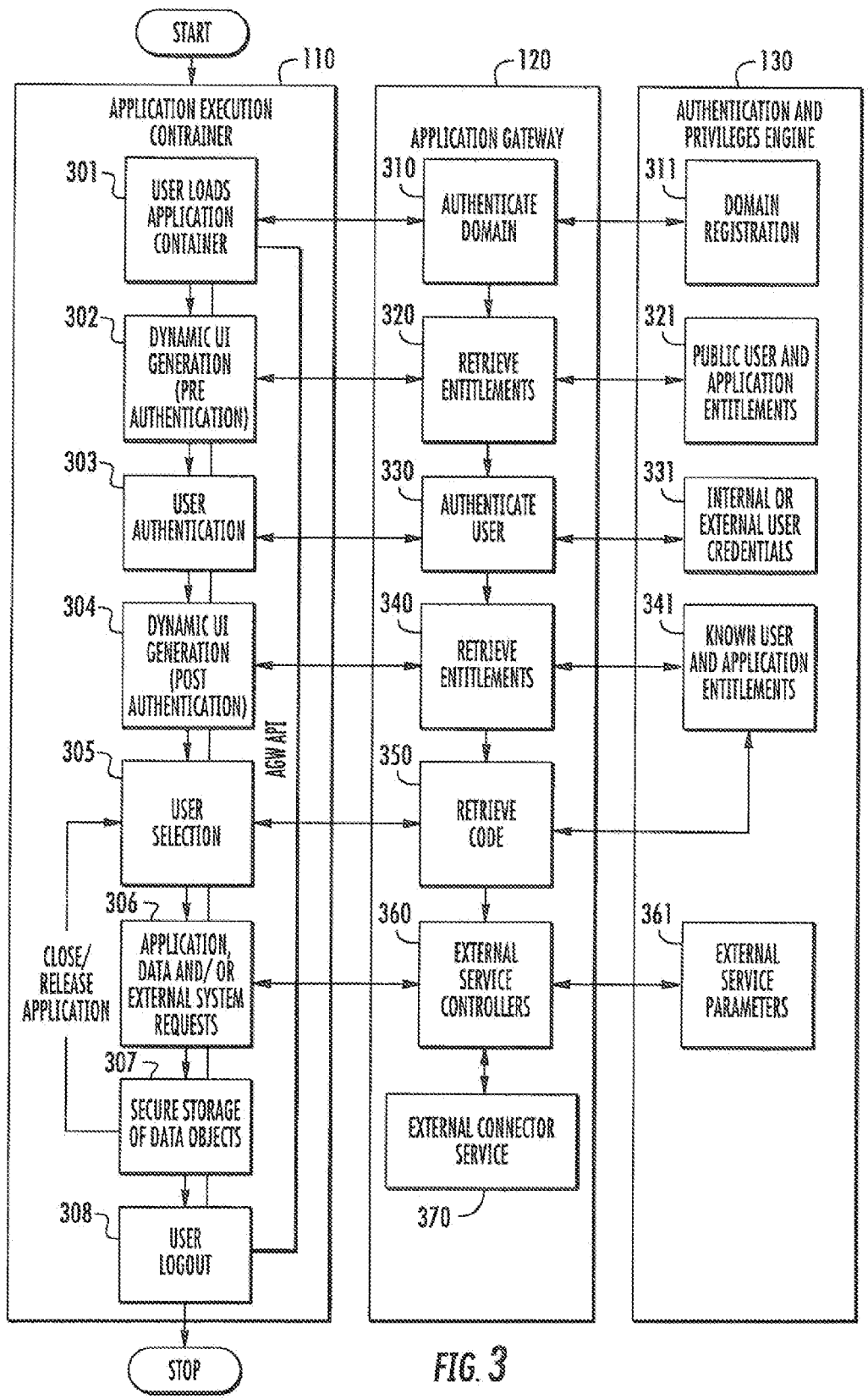
FIG. 3 is a flowchart illustrating operations of an application execution container and associated external providers according to some embodiments of the present inventive concepts.

FIG. 3 is a flowchart illustrating operations of an application execution container 110 and associated external providers according to some embodiments of the present inventive concepts. FIG. 3 provides additional details to the steps outlined herein with respect to FIG. 2.

As illustrated in FIG. 3, an application execution container 110 may be loaded by a user at step 301. Loading the application may be accomplished by selecting the application execution container 110 from a list of programs to be executed, by clicking on a provided link, or by other methods for initiating a computer application as understood by one of ordinary skill in the art.

After loading, a first portion of the user interface may be dynamically generated at step 302. In some embodiments, the first portion of the user interface may be dynamically generated prior to the user being authenticated in by the system architecture 100.

Following the pre-authentication user interface generation, the user of the application execution container is authenticated at step 303. The authentication process, which will be explained in more detail herein, can confirm that the user is entitled to use the application execution container 110 and which secondary applications 112 will be made available to the user.

After authentication, a second portion of the user interface may be dynamically generated at step 304. In some embodiments, the second portion of the user interface may be dynamically generated after the user is authenticated by the system architecture 100. The second portion of the user interface may reflect those features which are associated with content which the user is specifically authorized to see and/or utilize.

At step 305, the user may select a secondary application 112 to execute. A secondary application 112 can provide access to services and/or data available from external systems such as the primary service provider 140 or one or more secondary service providers 150.

Once executed, at step 306, the secondary application 112 may make requests to the application gateway node 120. These requests may be for data which can be provided by the application gateway node 120 or from external systems such as the primary service provider 140 or one or more secondary service providers 150.

Depending on the type of access performed by the secondary application 112, secure data related to the operations of the secondary application 112 may be stored via the application execution container 110 and the application gateway node 120.

As illustrated in FIG. 3, the user may continue to execute secondary applications 112 within the application execution container 110 by repeating steps 305-307. Though these steps are illustrated serially within FIG. 3, one of ordinary skill in the art will recognize that the secondary applications 112 could operate in parallel. In some embodiments of the present inventive concepts, execution of the secondary applications 112 will be restricted to running serially such that only one secondary application 112 is running at a time.

When the user is finished with the application execution container 110, the user may logout of system architecture 100 and close the application execution container 110 at step 308. The user may also be permitted to log out or other methods, such as an automatic "timeout" expiration of a session, may be provided.

At step 301 when the user loads the application execution container 110, the application execution container 110 can query the application gateway node 120 via the application gateway node API 113 (AGW API). At step 310, the application gateway node 120 can authenticate the domain of the application execution container 110. In some embodiments, authenticating the domain can include validating the machine and/or platform which is executing the application execution container 110 and/or validating the version of the application execution container 110. In some embodiments, authenticating the domain can include validating the access location of the secondary application 112 and/or the application execution container 110. To authenticate the domain, the application gateway node 120 can query the authentication and privileges engine 130 to validate domain registration data 311 provided by the application execution container 110. In some embodiments, successful authentication of the domain will be required before further operations can be performed by the application execution container 110.

As illustrated in FIG. 3, step 302 to dynamically generate user interface elements prior to authentication can query the application gateway node 120 via the application gateway node AGW API 113. At step 320, the application gateway node 120 can query the authentication and privileges engine 130 to retrieve entitlements 321 which are available to a public user. Entitlements which are available to a public user are those entitlements which are available without special authentication. In other words, public entitlements are those entitlements which may be available to a user regardless of their authentication level within the system.

In some embodiments, the user authentication step 303 queries the application gateway node 120 via the AGW API 113 to exchange user credentials. The application gateway node 120 can further query the authentication and privileges engine 130 to authenticate the user by comparison to internal or external user credentials 331 contained within the authentication and privileges engine 130. Authenticating the user can validate that the user has the appropriate permission to execute the application execution container 110. Authentication can also establish the entitlements available to the user, to be discussed more herein. Additional details related to the user authentication step 303 are illustrated herein with respect to FIG. 4.

After successful authentication, additional user interface elements can be displayed by the application execution container 110. As illustrated in FIG. 3, the application execution container 110 uses the AGW API 113 to retrieve entitlements for the now-authenticated user at step 340. The AGW API 113 may retrieve the known user and application entitlements 341 for the authenticated user from the authentication and privileges engine 130. The entitlements control which secondary applications 112 are available to the authenticated user as well as what functionalities those secondary applications 112 can perform. For example, once authenticated, user "Bob" may have access to Application X, which provides access to Bob's confidential data on a primary service provider 140. The entitlements may further provide that Bob can view the confidential data via Application X, but may not delete it. Entitlements and the processes used to retrieve them are illustrated more fully in FIG. 5 and discussed herein.

Once the complete set of entitlement is received by the application execution container 110 at step 340, the application execution container 110 can complete the user interface display indicating the secondary applications that are available for execution at step 304.

Retrieving the entitlements may allow the application execution container 110 to determine which secondary applications 112 are to be made available to the user. As part of this determination the application execution container 110 can also retrieve a user interface portion 118 of the secondary application 112 to display to the user with the application execution container 110. As described herein, the secondary applications 112 may be separated into a user interface portion 118 and a functional portion 117. Once the application execution container 110 has determined the secondary applications 112 to which the user is entitled, the application execution container 110 may retrieve the user interface portion 118 for respective ones of the plurality of secondary applications 112 to display within the application execution container 110.

In some embodiments, because the user interface portion 118 of the secondary applications 112 are downloaded dynamically based on the user entitlements, the visual display can be altered depending on the particular user. For example, if a similar external service is marketed to two different users through different entities, the same secondary application 112 may have a different user interface with a different branding for the first user than the second user. In some embodiments, though the user interface portions 118 of the secondary applications 112 may be different, the underlying functional portion 117 of the secondary applications 112 may be substantially the same.

At steps 305-307, a user may select a secondary application 112 for execution. When a given secondary application 112 is selected for execution 305 within the application execution container 110, the application execution container 110 accesses the application gateway node 120 via the AGW API 113 to retrieve the functional code (e.g. the functional portion 117 of the secondary application 112) to execute the secondary application 112 at step 350. That is to say that the code for execution the secondary application 112 does not exist on the application execution container 110 until the user selects the secondary application 112 and the application execution container 110 retrieves the functional portion 117 of the secondary application 112 from the application gateway node 120. In some embodiments, the application gateway node 120 may check permissions of the user with the authentication and privileges engine 130 to ensure that the user has been granted access to run the selected secondary application 112. If the user does not have access to the secondary application 112, the secondary application 112 can display an error message which has been defined in the execution code for the secondary application 112 that is displayed for those who are not authorized access to it.

For security purposes, the secondary application 112 may be run substantially from memory. In other words, when secondary application 112 is retrieved to the application execution container 110, it may be stored in memory, and the secondary application 112 may execute from the memory in which it is stored. In some embodiments, this memory from which the secondary application 112 runs may consist solely of volatile memory. One of ordinary skill in the art will recognize that executing substantially from memory would not preclude standard memory paging to a non-volatile storage device that may be performed as a generic function of the operating system.

The secondary application 112 may be constructed so that it may be substantially only executed within the application execution container 110. That is to say that the application execution container 110 has the means to operate the instructions provided with the secondary application 112, but the secondary application 112 may not be executed when selected outside the environment of the application execution container 110.

To support the development of secondary applications 112, the system architecture 100 may optionally provide software development kits (SDK) which provide application developers the capability of constructing and testing secondary applications 112 within the application execution container 110. In some embodiments, the SDK can provide access to local device features such as a camera, file upload, GPS, accelerometer, etc.

While executing, the secondary application 112 may only communicate with the application execution container 110 through the AGW API 113. As discussed herein, any accesses made by the secondary application 112 to another external system or another secondary application 112 must be made through the application execution container 110. In some embodiments, the AGW API 113 may be the only path available to the secondary application 112 to access outside of the application execution container 110.

To facilitate communication with another system, the secondary application 112 may utilize the AGW API 113 to communicate with the application gateway node 120. The application gateway node 120 can funnel the request to external service controller 360 within the application gateway node 120. The application gateway node 120 may be configured to connect to a primary service provider 140. In some embodiments, the application gateway node 120 may be further configured to connect to one or more secondary service providers 150. Connector parameters 361 that may be required to communicate with the primary service provider 140 and/or the secondary service provider 150 may be stored in the authentication and privileges engine 130.

The application gateway node 120 may be configured to communicate with the primary service provider 140 and/or a secondary service provider 150 via functionality included in an external connector service 370 (e.g., associated external connectors, described herein) of the application gateway node 120. Within the external connector service 370 may be stored the procedures needed to successfully initiate and complete a transaction to the primary service provider 140 and/or a secondary service provider 150. In some embodiments, the external connector service 370 of the application gateway node 120 may be pre-configured with functionality required to communicate with the primary service provider 140. In some embodiments, the external connector service 370 of the application gateway node 120 can allow for communication to at least one secondary service provider 150. In some embodiments, the external connector service 370 of the application gateway node 120 may be updated after the application gateway node 120 has been deployed. Updates to the external connector service 370 may allow for communication to a different primary service provider 140 and/or additional secondary service providers 150.

The application execution container 110 may maintain a global session which may contain data which may be shared, if entitlements allow, with respective ones of the executing secondary applications 112. This session may allow for persistent data to be provided between secondary applications 112 so that data persistence may be maintained for the user.

When initially executed within the application execution container 110, the secondary application 112 may not be required to authenticate the user. Instead, upon execution, the secondary application 112 will inherit the authentication provided to the application execution container 110 for the user. Though the secondary application 112 will be authenticated, it will be kept isolated from the underlying user authentication information.

The application execution container 110 may isolate the user identity and authentication information from the secondary applications 112. In some embodiments, the secondary applications 112 are not required to know and/or may be abstracted from the authentication information available to the application execution container 110. In other words, the secondary applications 112 executing in the application execution container 110 may be unable to determine the identity and/or authentication information of the user executing the application execution container 110. In some embodiments, the application execution container 110 may provide the secondary application 112 with an encrypted object containing the embedded user identity and/or authentication information. The encrypted object may be configured to contain the identifying information of the user of the application execution container 110. The encrypted object may be created as part of a successful user authentication with the application gateway node 120 by the authentication and privileges engine 130. The encrypted object may be configured so that the authentication and privileges engine 130 may be able to decrypt the information but the secondary application 112 and/or the application execution container 110 cannot. The secondary application 112 may be provided the encrypted object as part of its execution environment. The secondary application 112 may further be able to pass the encrypted object to the application gateway node 120 as part of calls made via the AGW API 113. In this way, the application gateway node 120 may be able to determine the authenticated user on whose behalf the secondary application 112 is performing the AGW API 113 interface call, but the secondary application 112 can still be prevented from determining the authentication information of the user.

In other embodiments, the encrypted object may be maintained by the application execution container 110 and the AGW API 113 rather than the secondary application 112. That is to say that the encrypted object may not be passed to the secondary application 112, but instead held by the application execution container 110. In some embodiments, the secondary application 112 may make a request to the AGW API 113 for access to the application gateway node 120. The request from the secondary application 112 to the AGW API 113 may not include the encrypted object. The AGW API 113 may in turn pass the request from the secondary application 112 to the application gateway node 120 with the encrypted object.

During some aspects of the execution of the secondary application 112, the application gateway node 120 may determine that additional authentication is necessary. The application gateway node 120 may determine that a particular operation requires additional security or a verification of identity. For example, the user may attempt a bank transaction through a secondary application 112 that exceeds a predetermined transaction threshold. At such a determination, the application gateway node 120 may require the user to provide additional authentication. As discussed herein with respect to initial user authentication, this additional authentication may take the form of a pre-scripted question, an additional code, or some type of physical characteristic of the user such as voice or fingerprint, though the present inventive concepts are not limited thereto. As would be understood by one of skill in the art, any type of multi-factor authentication may also be appropriate for the additional authentication. When a determination is made that such additional authentication is necessary, the application gateway node 120 may notify the application execution container 110 that the pending operation cannot complete without the additional authentication being provided. The application execution container 110 may then provide a user interface or other functionality to retrieve the requested additional authentication information from the user. Any additional authentication information provided by the user will then be provided to the application gateway node 120 via the AGW API 113. Though the application execution container 110 performs this operation on behalf of the secondary application 112 based on a transaction initiated by the secondary application 112, the secondary application 112 may be unaware of the need for additional authentication, the authentication method that was pursued, or the authentication information that was provided by the user. In this way, a heightened security environment may be maintained by the application execution container 110.

In some embodiments, the secondary application 112 may request the additional authentication from the application execution container 110. The secondary application may wish to receive additional authentication for a transaction selected by the user within the secondary application 112. Though this additional authentication was requested by the secondary application 112, the additional authentication may still be performed by the application execution container 110 via the AGW API 113 to the application gateway node 120. In other words, the secondary application 112 may request the additional authentication, but the actual authentication may be conducted via mechanisms outside the control of the secondary application 112. In such an embodiment, the secondary application 112 may receive an indication via the application execution container 110 that the additional authentication was successful.

Once the user has completed their usage of a particular secondary application 112, they may exit from that particular secondary application 112 without exiting from the application execution container 110. The user may then execute another, or the same, secondary application 112. In some embodiments, secondary applications 112 may be executed serially and/or concurrently with one another.

When the user wishes to exit from the application execution container 110, the user may logout 308 from the application execution container.

In some embodiments, the user of the application execution container 110 may manage the secondary applications 112 that are presented via secondary application management capabilities made available to the user within the application execution container 110. These capabilities may provide the ability to show or hide secondary applications 112 in the application execution container 110, add secondary applications 112 to the application execution container 110, delete such secondary applications 112, and modify display preferences such as which added secondary applications 112 appear where and in what order. Similar to the secondary application user restrictions, secondary application management capabilities may be tailored or customized to the user based on the user's relationship with the external service providers such as the primary service provider 140 and/or a secondary service provider 150. Of the secondary applications 112 developed for use within the application execution container 112, the primary service provider 140 may be in control of what secondary applications 112 are offered to which users and may not be required to offer individual secondary applications to any users. The primary service provider 140 may restrict access to available secondary applications 112 based on its preferences (such as to those that do not apply to its provided services), its market segmentation techniques, and/or based on which products and services the user holds with the primary service provider 140. In some embodiments, user risk profiles may also be taken into account. The application management may control which secondary applications 112 in their entirety are made available to users within the application execution container 110, where application user restrictions (described above) apply to restricting access to features within secondary applications 112 for which the user is granted access. Within the bounds of what the primary service provider 140 makes available to individual users, users can then tailor the user experience based on individual taste and needs. The option to pay for premium applications and enhancements may also be provided.

Figure 4:
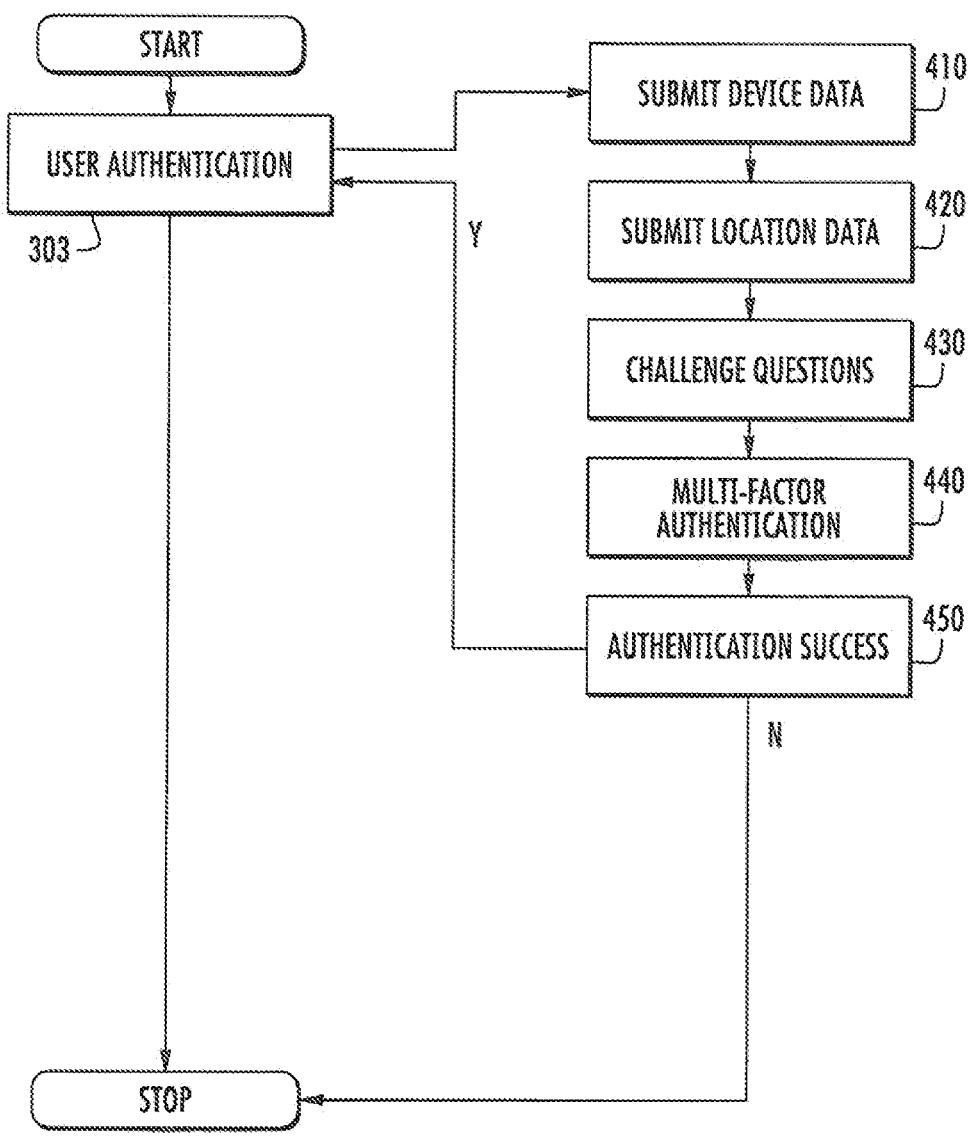
FIG. 4 is a flowchart illustrating operations of authentication for an application execution container according to some embodiments of the present inventive concepts.

FIG. 4 is a flowchart illustrating operations of authentication for an application execution container 110 according to some embodiments of the present inventive concepts. The user experience includes user authentication which may combine common authentication techniques with mobility enhanced authentication techniques. Common authentication techniques may include things such as usernames, passwords, tokens, one time passwords and so forth. These may be combined with mobility enhanced authentication techniques such as recognizing individual mobile device and location information and submitting these to the authentication common service for scrutiny during the authentication process. Mobile device recognition may include determining the state of the device, such as if the user is properly authenticated to the device through device PIN and/or other authentication techniques, such as fingerprinting technologies.

Enhanced authentication techniques may apply to unknown users and high risk activities where "challenge questions" can be asked to verify the user's identity. User authentication can be handled during multiple points of the user interaction. In some embodiments, user authentication can be handled upon enrollment to use the application execution container 110. In some embodiments, user authentication can be handled upon downloading and configuring the application execution container 110 and subsequently accessing the application execution container 110. Secondary authentication may also be required upon attempting to execute high risk activities.

As illustrated in FIG. 4, at steps 410 and 420 the action by the application execution container 110 via the AGW API 113 can provide device data and location data in addition to the user credentials. The application gateway node 120 can be configured to approve authentication for a particular user only for certain devices or only when accessed from particular locations.

For example, the application gateway node 120 may only approve access for user "Bob" via a smartphone if the access is performed within the United States. Conditions such as these may be maintained within the authentication and privileges engine 130 but may be updated. For example, in some embodiments, the authentication and privileges engine 130 may be updated via communications with the primary service provider 140. In other embodiments, portions of the authentication and privileges engine 130 may be updated by a properly authenticated user. For example, user "Bob," once authenticated, may further authenticate a second smartphone he owns. Similarly, "Bob" could allow access from a location outside the United States while "Bob" is on vacation.

At steps 430 and 440, the application gateway node 120 may implement challenge questions and/or other types of multi-factor authentication. These additional steps may represent actions that the user must affirmatively perform or questions that the user must affirmatively answer before authentication will be successful. For example, the application gateway node 120 may require the user of the application execution container 110 to answer a security question such as "What is your mother's maiden name?" As another example, the application gateway node 120 could require that the user of the application execution container 110 provide a fingerprint scan through some input option of the user device upon which the of the application execution container 110 is executing. As another example, the application gateway node 120 could send a text message containing a code word to a known phone of the user and require the user of the application execution container 110 to enter the correct code before authentication is successful. In yet another example, the application gateway node 120 could provide the location of the local device as an additional factor for authentication such that only accesses from certain physical locations would be authenticated. The foregoing examples are provided as examples only and are not intended to limit the present inventive concepts.

Access to the authentication functionality of the application gateway node 120 may be provided to the application execution container 110 via access to an authentication interface provided by the AGW API 113. This authentication interface can allow the application execution container 110 to exchange data with the application gateway node 120 to perform the various steps required for authentication.

If the application gateway node 120 is able to successfully authenticate the user of the application execution container 110 via the authentication and privileges engine 130, the application gateway node 120 returns a successful authentication result to the application execution container 110 via the AGW API 113.

Figure 5:
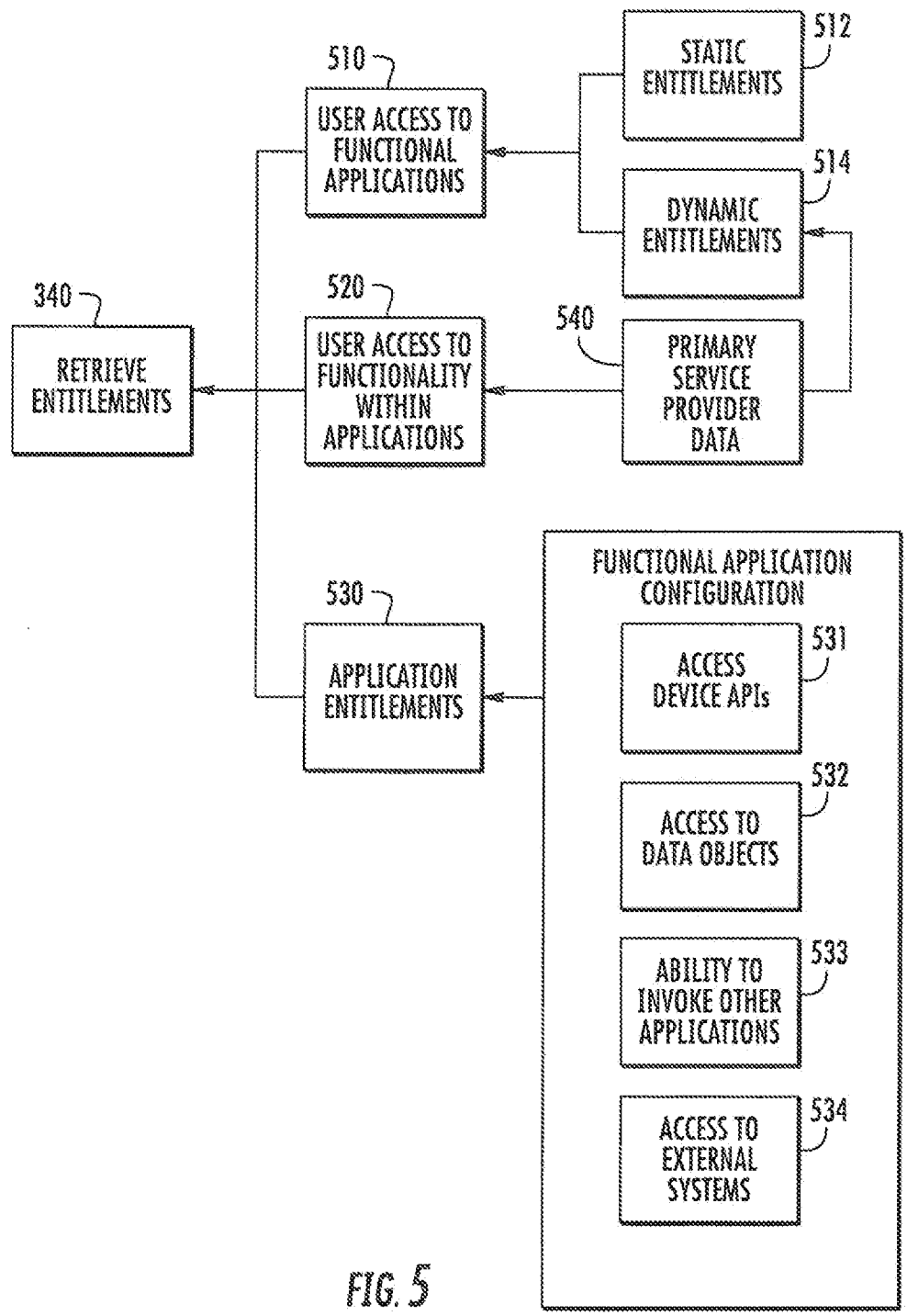
FIG. 5 is a flowchart illustrating operations of retrieving entitlements for an application execution container according to some embodiments of the present inventive concepts.

FIG. 5 is a flowchart illustrating operations of retrieving entitlements for an application execution container 110 according to some embodiments of the present inventive concepts. As illustrated in FIG. 5, retrieving entitlements can include determining user access to secondary applications 112 (510), determining user access to functionality within secondary applications 112 (520), and determining secondary application 112 entitlements (530). In some embodiments, retrieved entitlements may be cached at the application execution container 110. In some embodiments, certain entitlements may be verified by the application execution container 110 periodically. In some embodiments, certain entitlements may be verified by the application execution container 110 with every transaction.

Determining user access to secondary applications 112 (510) may include determining which secondary applications 112 will be provided to the user. This determination can include both static entitlements 512 and dynamic entitlements 514. Static entitlements 512 are those entitlements which are provided to the authenticated user of the application execution container 110. Dynamic entitlements 514 are those entitlements which depend on the identity of the user of the application execution container 110 and a relationship that user may have, such as with the primary service provider 140 and/or a secondary service provider 150. These dynamic entitlements 514 require that the user be successfully authenticated in order to be determined. In other words, the list of secondary applications 112 which a user can access includes the set of those applications available to authenticated users of the application execution container 110 and the set of those applications which are available to this specific user based on the user's identity and/or relationships. It will be understood that entitlements which are based on a user's identity may be based on relationships the user has with the primary service provider 140 and/or the secondary service providers 150.

Determining user access to functionality within secondary applications 112 (520) may require that the user be authenticated. As discussed herein, the functionality within a particular secondary application 112 may be limited or expanded for a particular user depending on their entitlements.

Retrieving dynamic entitlements 514 and entitled functionality for a user within secondary applications 112 may be accomplished by the application execution container 110 via the AGW API 113. The AGW API 113 may allow communication with the application gateway node 120 to retrieve the entitlements from the authentication and privileges engine 130. In some embodiments, the application gateway node 120 may further communicate with the primary service provider 140 to access the entitlements for the authenticated user and/or retrieve primary service data 540 which may be used to determine the entitlements. In some embodiments, additional entitlements may be retrieved from other external system, such as a secondary service provider 150.

Determining secondary application 112 entitlements (530) may include determining the functionality available to a particular secondary application 112 when selected by the user. As illustrated in FIG. 5, there may be multiple entitlements applicable to secondary applications 112.

For example, an entitlement may determine whether a secondary application 112 can access devices via device APIs (531) on the machine running the application execution container 110. For example, in some embodiments, an entitlement may limit the access of a secondary application 112 to the USB subsystem of the device running the application execution container 110. In some embodiments, an entitlement may limit the access of a secondary application 112 to a GPS device of the device running the application execution container 110. In another embodiment, an entitlement may limit the access of a secondary application 112 to the camera of a smartphone running the application execution container 110. In yet another embodiment, an entitlement may allow the access of a secondary application 112 to a fingerprint input circuit of the device running the application execution container 110. However, the present inventive concepts are not limited thereto.

Another application entitlement may be access to data objects (532) maintained by the application execution container 110. As will be discussed more fully herein, the application execution container 110 may maintain session and other data objects which can be shared among the secondary applications 112. An example embodiment may have an entitlement which restricts access to the shared session data or limits the access only to certain objects. However, the present inventive concepts are not limited thereto.

In some embodiments, an application entitlement may include the ability to invoke other applications (533). Within the application execution container 110, the application execution container 110 may allow a first secondary application 112 to invoke a second secondary application 112. For example, a secondary application 112 to provide authenticated secure access to hospital payment records may wish to invoke another secondary application which provides authenticated secure access to an insurance provider. However, the present inventive concepts are not limited thereto.

In some embodiments, an application entitlement may include the ability for the secondary application 112 to access external systems (534). Within the application execution container 110, all external communication by a secondary application 112 must pass through the application gateway node 120. In other words, any communication by a secondary application 112 must pass through the application execution container 110. In this way, if permitted, a first secondary application 112 can communicate with a second secondary application 112 running within the same application execution container 110. If the secondary application 112 wishes to communicate outside of the application execution container 110, the secondary application must communicate through the AGW API 113 to the application gateway node 120. The application gateway node 120 may further use its external connector service 370, described herein, to connect to yet another external system. To perform such communication, however, the secondary application 112 must first have the appropriate application entitlement, as illustrated in step 530 of FIG. 5.

Figure 6:
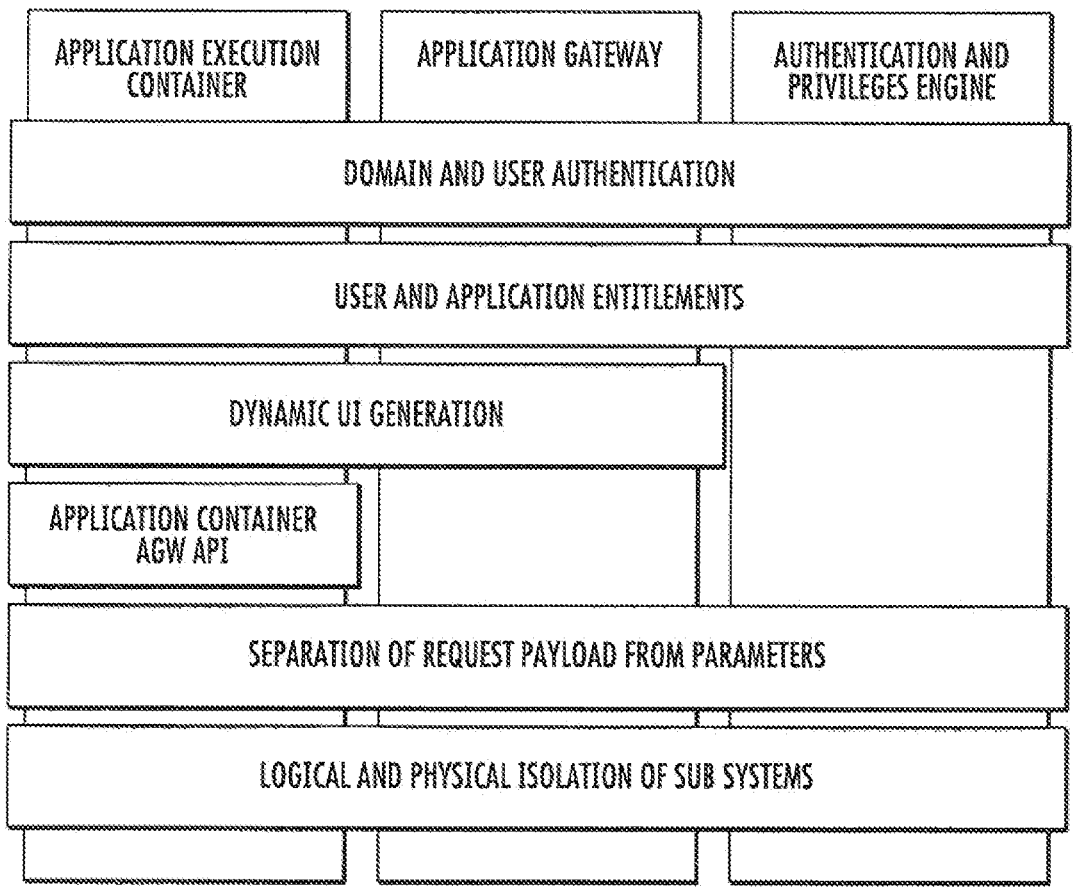
FIG. 6 is an illustrative model of a security architecture for an application execution container according to some embodiments of the present inventive concepts.

FIG. 6 is an illustrative model of a security architecture for an application execution container 110 according to some embodiments of the present inventive concepts.

As illustrated in FIG. 6, multiple security layers may combine to allow the security of the system architecture 100 to dynamically render a cohesive multi-application user experience across a variety of digital devices without compromising the security and integrity of the overall system architecture 100.

In some embodiments, the security layers may include domain and user authentication. When the user loads the application execution container 110, the system architecture 100 verifies the domain being utilized and may only serve up the application execution container 110 if the application execution container 110 has been properly configured in the system architecture 100. The application execution container 110 may also determine that secondary applications 112 requiring user authentication are accessible only following a successful authentication attempt. User authentication may be supported via both single and multi-factor authentication through internal system capabilities as well as through integration to secondary service providers' 150 systems as required by the secondary service providers 150.

In some embodiments, the security layers may include user and application entitlements. Static user entitlements, rules for dynamic user entitlements as well as application entitlements may be maintained in the authentication and privileges engine 130. These entitlements are presented back to the application gateway node 120 and application execution container 110 upon request to enable dynamic user interface generation and enforcement of entitlements through the AGW API 113.

In some embodiments, the security layers may include dynamic user interface (UI) generation. The user interface may be generated dynamically for the user based on the entitlements provided by the authentication and privileges engine 130. By generating the UI dynamically for the user, the system may provide a lower risk for backdoors that would grant access to application functionality to which the user is not entitled. The UI presented to an individual user does not simply hide unentitled secondary applications 112, but instead may not include them in the UI presented to the user. In addition, code supporting individual functional applications such as HTML, JavaScript®, and stylesheets for which the user is entitled may only be loaded upon demand for the secondary application 112. Code supporting unentitled secondary applications 112 may not be loaded and may not be accessible by the application execution container 110. In the context of a user session the application execution container 110 may not be aware of unentitled secondary applications 112. Once use of an individual secondary application 112 is concluded, code supporting it may then be unloaded by the application execution container 110.

In some embodiments, the security layers may include the AGW API 113. The AGW API 113 inside the application execution container 110 can enforce the application entitlements provided by the authentication and privileges engine 130. This may include entitlements to access data and external systems (through the application gateway node 120) as well as APIs for communicating with the local device and access mechanisms to invoke other secondary applications 112. The AGW API 113 can restrict secondary applications 112 from being able to call external systems directly. Instead, the AGW API 113 may route all outbound traffic to the application gateway node 120.

In some embodiments, the security layers may include separation of request payload from authentication parameters. The logical and physical separation of request payload received from the application execution container 110 from access credentials maintained in the authentication and privileges engine 130 can provide an additional security layer within the system, these elements may be combined at the last moment without the knowledge of the application execution container 110 or authentication and privileges engine 130 to protect against unauthorized access to data and external systems. The application execution container 110 may not be aware of access credentials required to connect to external systems. An encrypted object may be utilized to match up the request from the application execution container 110 with the appropriate credentials from the authentication and privileges engine 130. The encrypted object can only be decrypted by the authentication and privileges engine 130.

In some embodiments, the security layers may include logical and/or physical isolation of sub-systems. The present inventive concepts may mitigate risk through a coordinated approach that integrates the application execution container 110, application gateway node 120, and authentication and privileges engine 130 in the support of a cohesive user experience while isolating the performance of discrete functions to ensure the security and integrity of the overall system architecture 100. In addition to logically and/or physically separating the application execution container 110 from the application gateway node 120 and from the authentication and privileges engine 130, the system architecture 100 may also logically and/or physically separate the core application gateway node 120 functionality from the external connector service 370 to ensure that internal system logic is not intermingled and/or accessible to logic created to facilitate connectivity to external systems. In some embodiments, the application gateway node 120 and the external connector service 370 may be deployed on separate computing systems and may be interconnected. In some embodiments, the interconnection between the application gateway node 120 and the external connector service 370 may be accomplished with web services. It will be understood that this separation is not necessarily limited to the application gateway node 120 and the external connector service 370. Other components described herein may be similarly separated.

As discussed herein, the present inventive concepts may isolate the performance of discrete functions to ensure the security and integrity of the overall architecture. This includes logical and physical separation of the major components of the solution: the application execution container 110, the application gateway node 120 and authentication and privileges engine 130. This separation may also include the separation of the core application gateway node server-side functionality from the external connector service 370.

A key benefit of this approach is that secondary applications 112 may be isolated from external systems, such as the primary service provider 140 and/or a secondary service provider 150, and must communicate with these systems through the intermediary layer, the application gateway node 120 via the AGW API 113. This is unique from standalone systems where secondary applications 120 are able to communicate directly with external systems. The application gateway node 120 may therefore perform various security functions.

In some embodiments, the application gateway node 120 may perform authentication of requests from the secondary applications 112 before they go to external systems, such as the primary service provider 140 and/or a secondary service provider 150. In some embodiments, this authentication may include user and/or session authentication, including limits on session duration through encrypted session tokens embedded in requests. In some embodiments, this authentication may include secondary application 112 authentication to restrict external server access only to permitted applications.

In some embodiments, the application gateway node 120 may perform separation of the secondary applications 112 (and application developers) from the credentials required to access external systems, such as the primary service provider 140 and/or a secondary service provider 150. In some embodiments, this separation may provide that secondary applications 112 do not need, nor can they access, credentials required for external connectivity. In some embodiments, this separation may provide that application developers can write secondary applications 112 without having to know how common data is accessed.

In some embodiments, the application gateway node 120 may perform logging and tracking of secondary application 112 and user activities performed throughout the system and across secondary applications 112. This logging may include audit trails of user activities as well as trend and anomaly detection capabilities. In some embodiments, this logging may be performed so as to support non-repudiation of any actions taken by the user with respect to the primary service provider 140 and/or a secondary service provider 150 via that application execution container 110. In some embodiments, this logging may comply with NIST 800 Level 3 authentication, but the present inventive concepts are not limited thereto.

Figure 7:
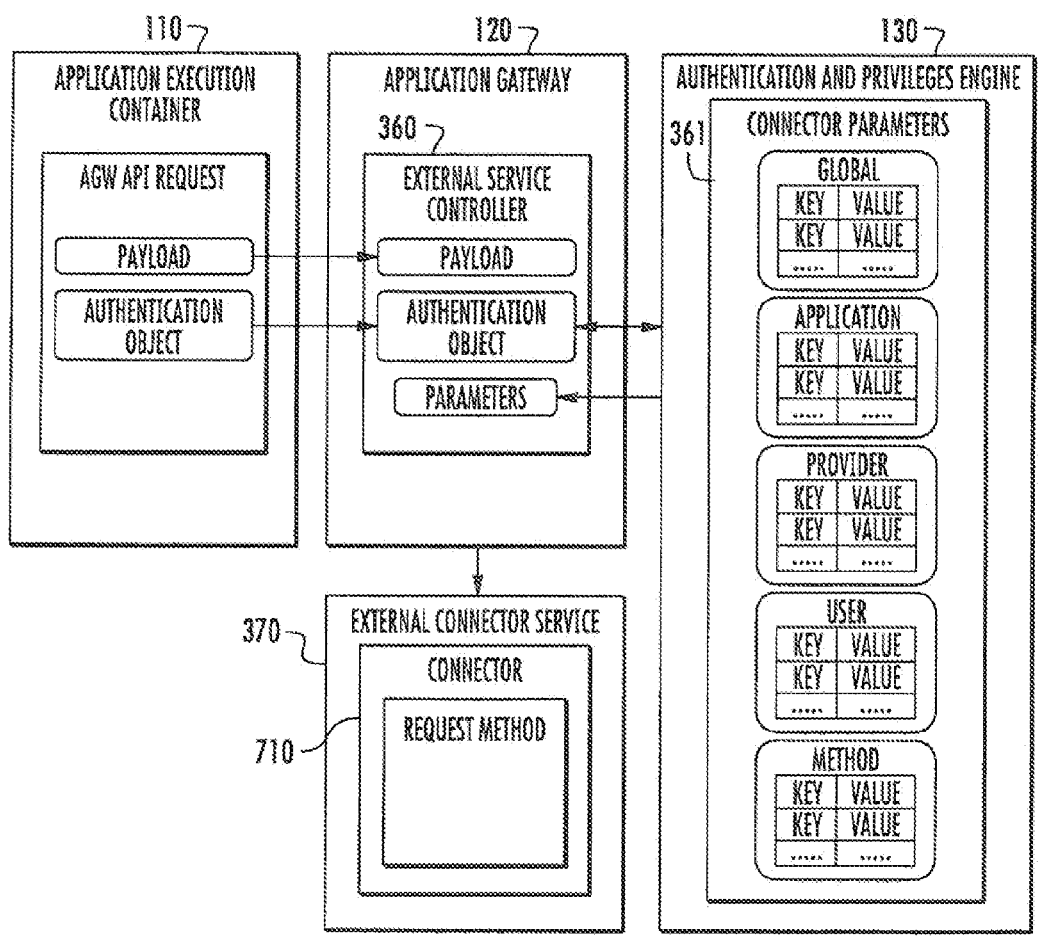
FIG. 7 is an illustrative model of an external connection architecture for an application execution container according to some embodiments of the present inventive concepts.

FIG. 7 is an illustrative model of an external connection architecture for an application execution container according to some embodiments of the present inventive concepts.

The application gateway node 120 can support external system connectivity via its external connector service 370. The application gateway node 120 may combine the message payload received from the application execution container 110 with the external connector parameters maintained in the authentication and privileges engine 130 as required to make a connection with an external system such as the primary service provider 140 and/or the secondary service provider 150, and call the appropriate external connector service 370 for fulfillment as illustrated in FIG. 7.

In some embodiments, the application gateway node 120 may access the encrypted object, illustrated in FIG. 7 as an authentication object, containing the user authentication information passed via the AGW API 113. The application gateway node 120 may interact with the authentication and privileges engine 130 to verify the user authentication information within the authentication object. This interaction may involve the decryption of the authentication object containing the user authentication information. In some embodiments, the ability to decrypt the authentication object containing the user authentication information may be isolated to specification modules, such as the authentication and privileges engine 130. It will be understood that the user authentication information identifying the user may be different than authentication or access information that may be used to make a connection with an external system such as the primary service provider 140 and/or the secondary service provider 150.

As illustrated in FIG. 7, the present inventive concepts can provide for a hierarchy of external system access parameters which may be maintained in the authentication and privileges engine 130. These external system access parameters may be utilized to validate that, in a multi-tenant, multiple application environment, only entitled users with entitled secondary applications 112 have access to functional capabilities, data and external systems to which they are affiliated. In order to ensure the security and integrity of the overall solution, the application execution container 110 may be unaware of user access credentials used to connect to external systems such as the primary service provider 140 and/or the secondary service provider 150. An attack against the application execution container 110 would not yield user credentials needed for external connectivity, as such parameters are not maintained by the application execution container 110.

As illustrated in FIG. 7, the secondary application 112 in the application execution container 110 may initiate a request to the AGW API 113 containing a particular payload intended for an external system (e.g. the primary service provider 140 and/or a secondary service provider 150). The request may be passed to the application gateway node 120 and handled by the external service controller 360 of the application gateway node 120. The external service controller 360 may determine the destination of the payload from the request. In some embodiments, the application gateway node 120 may link a request from the secondary application 112 to the primary service provider 140 and/or a secondary service provider 150 through a set of credentials that are maintained external to the secondary application 112. Based on the destination of the payload, the external service controller 360 can retrieve connector parameters 361 related to the destination from the authentication and privileges engine 130.

The parameters received from the authentication and privileges engine 130 can include, for example, global, application, service provider, user, and method parameters, though the present inventive concepts are not limited thereto. In some embodiments, the parameters can include name/value pairs, which can include the name of the parameter followed by a value. In some embodiments, the value can comprise a structure that includes both the type of the value, its length, and the value itself, a so-called TLV structure. One of skill in the art would recognize that there are multiple means of present parameters that would still be within the present inventive concepts.

Global parameters relate to parameters that must be provided related to the system 100 upon which the application execution container 110 and secondary applications 112 are executing. Application parameters relate to parameters that must be provided for the particular secondary application 112 that is attempting to access the external system. Service provider parameters relate to parameters associated with the external connector service 370, the primary service provider 140, and/or the secondary service providers 150. User parameters relate to parameters that may be associated with the particular user making the request of the external system. Method parameters relate to parameters that may be associated with the particular method being used to access the service on the external system.

Once the parameters have been retrieved from the authentication and privileges engine 130 for the AGW API request, the external service controller 360 may combine the parameters with the request payload received from the application execution container 110 and may provide the combined packet to the external connector service 370. The external connector service may then determine the particular external connector 710 needed to communicate with the external system specified. The external connector service 370 can then use the request payload, parameters, and selected external connector 710 to communicate with the external system.

External connectors 710 can support a variety of connections to a plurality of external systems using different protocols and standards. Individual external connectors 710 could use a smaller subset of the total hierarchical parameters available to function properly. For example, some may only require system level parameters while others may require various combinations of system, application, service provider, user and method level parameters. In some embodiments, external connectors 710 may support application developer logic to allow for proper mapping between data provided by external systems and what is expected within the secondary applications 112. The external connector service 370 environment may be run separately from the other application gateway node 120 functions from a physical deployment perspective for security purposes.

Figure 8:
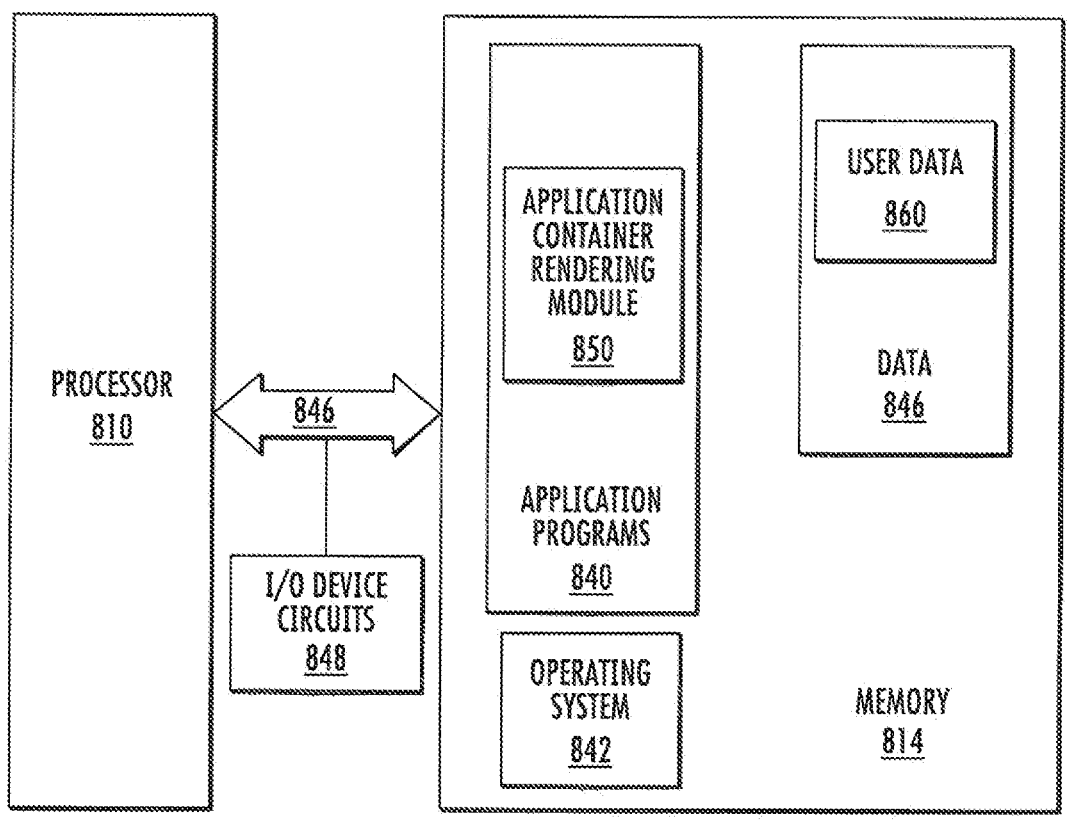
FIG. 8 is a schematic diagram of a processing system according to some embodiments of the present inventive concepts.

FIG. 8 is a schematic diagram of a processing system according to some embodiments of the present inventive concepts (e.g., to carry out the operations illustrated in FIGS. 1-7). As illustrated in FIG. 8, a data processing system includes processor 810 (which can be used to direct or carry out processes), a memory 814 and input/output circuits 848. The data processing system can be incorporated in a portable communication device and/or other components of a network, such as a server. The processor 810 communicates with the memory 814 via an address/data bus 846. The input/output circuits 848 can be used to transfer information between the memory (memory and/or storage media) 814 and another component, such as other processors or devices. These components can be conventional components such as those used in many conventional data processing systems, which can be configured to operate as described herein.

In particular, the processor 810 can be a commercially available or custom microprocessor, microcontroller, digital signal processor or the like. The memory 814 can include any memory devices and/or storage media containing the software and data used to implement the functionality circuits or modules used in accordance with embodiments of the present inventive concepts. The memory 814 can include, but is not limited to, the following types of devices: cache, ROM, PROM, EPROM, EEPROM, flash memory, SRAM, DRAM and magnetic disk. In some embodiments of the present inventive concepts, the memory 814 can be a content addressable memory (CAM). In some embodiments, the memory 814 may be volatile memory. In some embodiments, the memory 814 may include volatile and/or non-volatile memory portions. Volatile memory may be memory which loses its contents when a power supply to the volatile memory is removed. Non-volatile memory may be memory which retains its contents when a power supply to the non-volatile memory is removed.

As further illustrated in FIG. 8, the memory (and/or storage media) 814 can include several categories of software and data used in the data processing system: an operating system 842; application programs 840; input/output device circuits 848; and data 846.

As will be appreciated by those of skill in the art, the operating system 842 can be any operating system suitable for use with a data processing system, such as IBM®, OS/2), AIX® or zOS® operating systems or Microsoft® Windows® operating systems Unix or Linux™.

The input/output device circuits 848 typically include software routines accessed through the operating system 842 by the application program 840 to communicate with various devices. The application programs 840 are illustrative of the programs that implement the various features of the circuits and modules according to some embodiments of the present inventive concepts.

Finally, the data 846 represents the static and dynamic data used by the application programs 840, the operating system 842, the input/output device circuits 848 and other software programs that can reside in the memory 814.

The data processing system can include several modules, including a controller, such as an application execution container rendering module 850 that is configured to perform operations as described herein. The module can be configured as a single module or additional modules otherwise configured to implement the operations described herein for analyzing the motility profile of a sample. The data 846 can include user data 860, such as a user account data profile.

While the present inventive concepts are illustrated with reference to the application execution container rendering module 850 and the user data 860 in FIG. 8, as will be appreciated by those of skill in the art, other configurations fall within the scope of the present inventive concepts. For example, rather than being an application program 840, such as the application execution container rending module 850, these circuits and modules can also be incorporated into the operating system 842 or other such logical division of a data processing system. Furthermore, while the application execution container rendering module 850 in FIG. 8 is illustrated in a single data processing system, as will be appreciated by those of skill in the art, such functionality can be distributed across one or more data processing systems (e.g., a server, a mobile platform, etc.). Thus, the present inventive concepts should not be construed as limited to the configurations illustrated in FIG. 8, but can be provided by other arrangements and/or divisions of functions between data processing systems. For example, although FIG. 8 is illustrated as having various circuits and modules, one or more of these circuits or modules can be combined, or separated further, without departing from the scope of the present inventive concepts.

FIGS. 9-12 are screen shots of a graphical user interface used to perform operations according to example embodiments of the present inventive concepts.

As noted herein, the present inventive concepts may be advantageously deployed in environments in which secure transactions are required with minimal setup time, but with the ability to be extended to additional secondary applications 112 and/or additional external service providers. Examples of such environments include banking transactions, networked sales, health/medicine records, educational records and/or military systems, but the present inventive concepts are not limited thereto.

Figure 9:
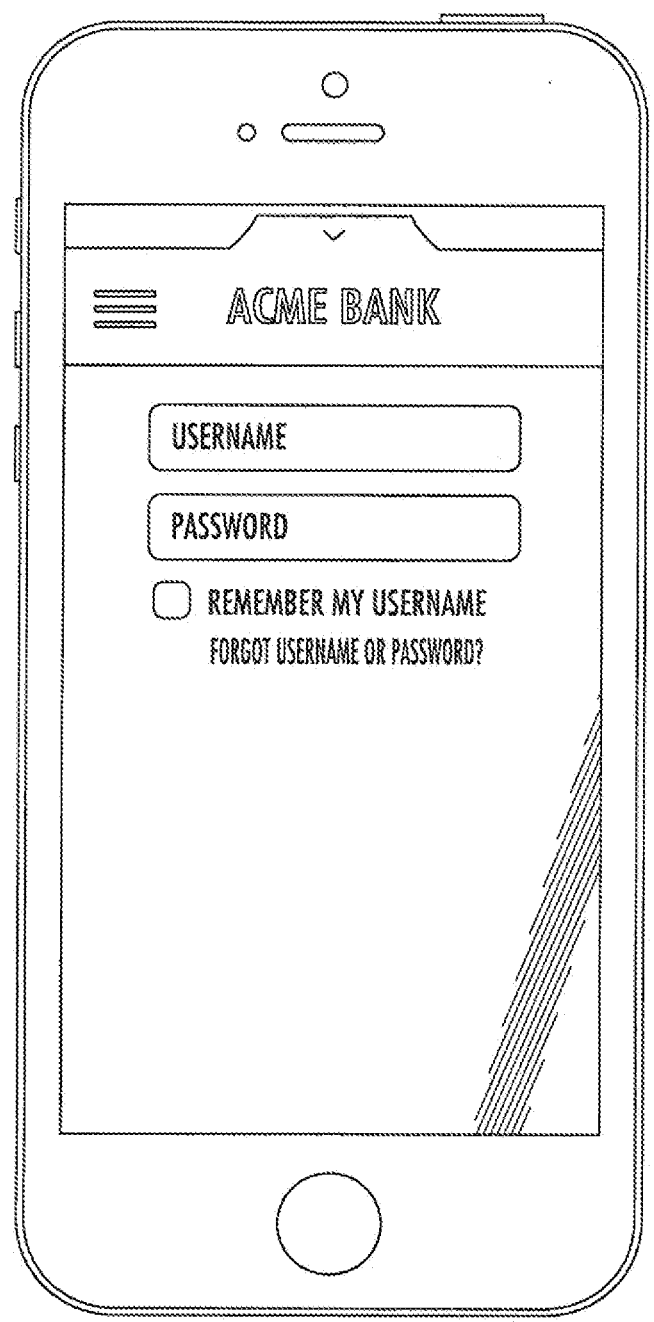
FIGS. 9-12 are screen shots of a graphical user interface used to perform operations according to example embodiments of the present inventive concepts.
Figure 10:
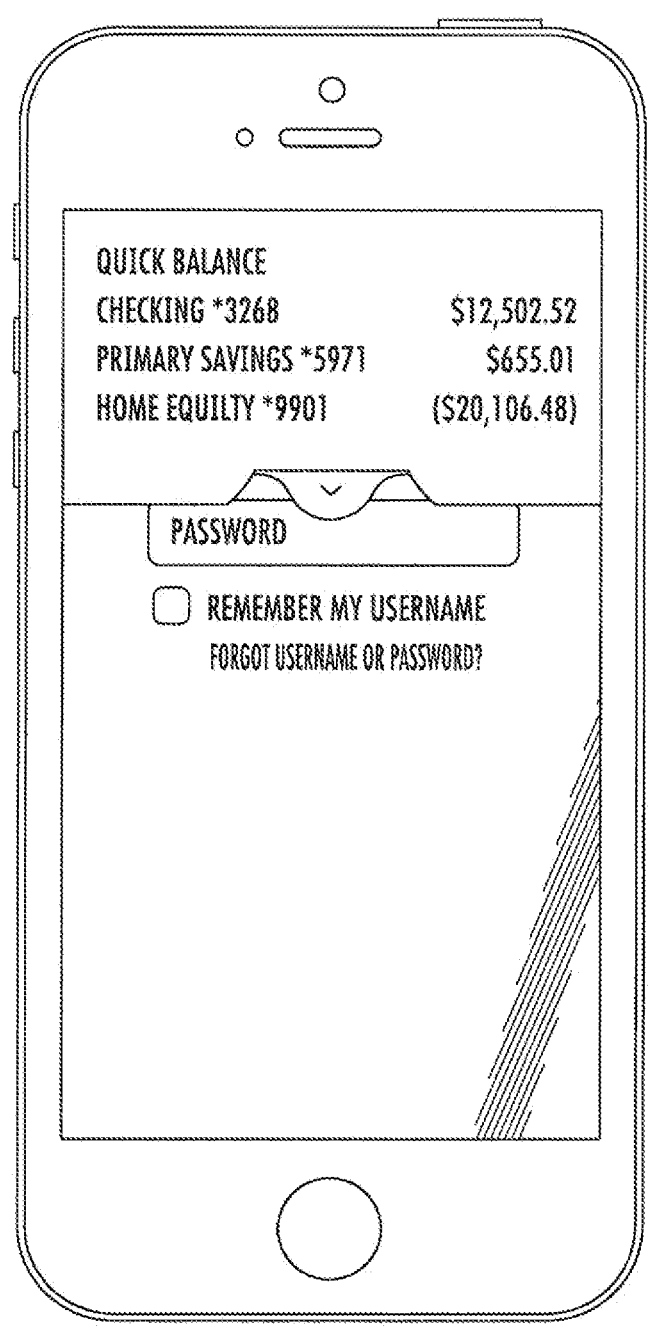
Figure 11:
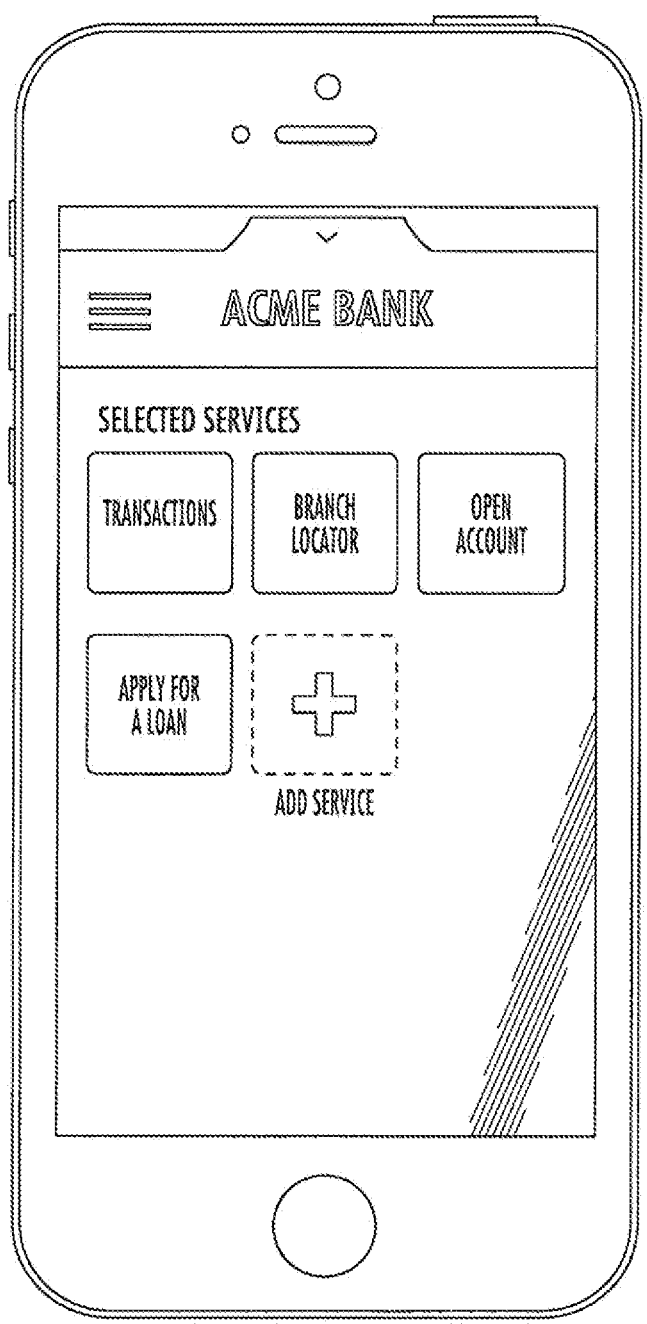
Figure 12:
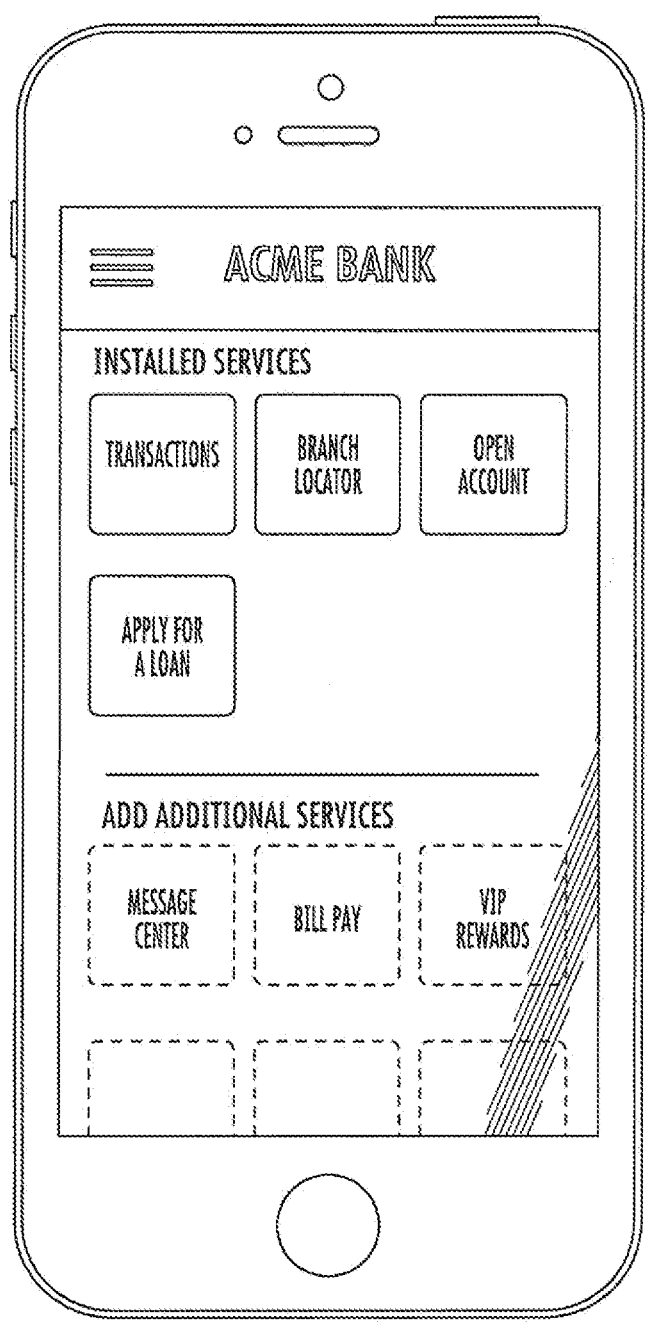

FIGS. 9-12 illustrate user interfaces for a sample embodiment according to the present inventive concepts which involves banking and which uses the inventive concepts outlined herein to provide banking services. A log-in screen is shown in FIG. 9, which can allow a user to enter a user name and password, or other security information, to access an account. After the user is authenticated, the user may view financial account information as shown in FIG. 10. A plurality of default secondary applications 112 may be displayed for the user as shown in FIG. 11, including an icon for downloading or adding services associated with additional secondary applications 112. When the user selects the icon for adding a service, additional secondary applications 112 may be displayed as shown in FIG. 12. If the user selects an icon representing a particular secondary application 112, it may be downloaded for use on the device. Although the user interface illustrated in FIGS. 9-12 is on a mobile device, such as a smart phone, it should be understood that other devices may be used, including tablet devices, personal computers and the like.

The present inventive concepts provide multiple advantages over the prior art. A system architecture 100 such as the one described herein should facilitate at least three of the following objectives.

First, users should be restricted from accessing secondary applications 112 to which they are entitled based on static and dynamic entitlements configured by the authentication and privileges engine 130. Second, secondary applications 112 should be limited to access data and external systems to which they are entitled based on system and service provider rules as well as preferences for such secondary applications 112. Third, data and external systems within the system architecture should be protected from unauthorized access.

In some embodiments, one potential advantage of the present inventive concepts may be the ability to support both static and dynamic user entitlements. This may allow an application gateway node 120 to calculate in real-time what secondary applications 112 a user should be allowed to utilize (e.g., a new wealth management customer might be dynamically granted access to special wealth management applications not available to other users). The application gateway node 120 may also choose to explicitly specify some user entitlements to access certain secondary applications 112. Static and dynamic entitlements can be utilized in any combination.

In some embodiments, another potential advantage of the present inventive concepts is that the system may offer secure, reusable integration capabilities to external systems such as the primary service provider 140 and/or a secondary service provider 150. An external connector 710 within the external connector service 370 may be utilized by multiple secondary applications 112, and a single secondary application 112 may utilize multiple external connectors 710 so long as this is permitted by configured entitlements.

In some embodiments, another potential advantage of the present inventive concepts is that secondary applications 112 may be isolated from external systems and should communicate with these external systems through an intermediary layer, the application gateway node 120. This may allow the application gateway node 120 to perform key security functions including authentication of requests before they go to external systems, abstraction of secondary applications 112 from the credentials required to access external systems, as well as logging and tracking of secondary application 112 and user activities.

In some embodiments, another potential advantage of the present inventive concepts is that the system architecture 100 may support data retrieval and secure storage (caching) of data retrieved from external systems. This can mean that objects containing information from external systems can be optionally maintained in the application execution container 110 for the duration of the user session for use across secondary applications 112.

In some embodiments, another potential advantage of the present inventive concepts is that the system architecture 100 may provide the application gateway node 120 with the ability to control which secondary applications 112 are offered to which users and under what conditions. In addition, the application gateway node 120 may not be required to offer individual secondary applications 112 to any of their users if this is not desirable.

In some embodiments, another potential advantage of the present inventive concepts is that the system architecture 100 may support the provisioning of standard APIs to control device functions for use across secondary applications 112, minimizing the overall footprint of the system architecture 100.

In some embodiments, another potential advantage of the present inventive concepts is that the functional breadth of the system architecture 100 may support a much wider range of capabilities than provided through existing digital architecture provided today.

In the above-description of various embodiments of the present inventive concepts, it is to be understood that the terminology used herein is for the purpose of describing particular embodiments only and is not intended to be limiting of the inventive concepts. Unless otherwise defined, all terms (including technical and scientific terms) used herein have the same meaning as commonly understood by one of ordinary skill in the art to which these inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected," "coupled," "responsive," or variants thereof to another element, it can be directly connected, coupled, or responsive to the other element or intervening element may be present. In contrast, when an element is referred to as being "directly connected," "directly coupled," "directly responsive," or variants thereof to another element, there are no intervening elements present. Like numbers refer to like elements throughout. Furthermore, "coupled," "connected," "responsive," or variants thereof as used herein may include wirelessly coupled, connected, or responsive. As used herein, the singular forms "a," "an," and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise," "comprising." "comprises," "include," "including," "includes," "have," "has," "having," or variants thereof are open-ended, and include one or more stated features, integers, nodes, steps, components or functions but does not preclude the presence or addition of one or more other features, integers, nodes, steps, components, functions or groups thereof. Furthermore, as used herein, the common abbreviation "e.g.," which derives from the Latin phrase "exempli gratia," may be used to introduce or specify a general example or examples of a previously mentioned item, and is not intended to be limiting of such item. The common abbreviation "i.e.," which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present inventive concepts may be embodied in hardware and/or in software (including firmware, resident software, micro-code, etc.) that runs on a processor such as a digital signal processor, which may collectively be referred to as "circuitry," "a module," or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present inventive concepts. All such variations and modifications are intended to be included herein within the scope of the present inventive concepts.

In the drawings and specification, there have been disclosed typical embodiments and, although specific terms are employed, they are used in a generic and descriptive sense only and not for purposes of limitation, the scope of the disclosure being set forth in the following claims.

What is claimed is:

1. A computer-implemented method, comprising:
   displaying, on a computing device, an application execution container configured to provide an execution environment to execute secondary applications within the application execution container;
   providing, by the application execution container, a secure network connection over a computer network between the secondary applications and an application gateway node;
   retrieving, by the application execution container, a plurality of secondary applications from the application gateway node over the secure network connection;
   executing, within the application execution container and responsive to selection by a user of the application execution container, one of the plurality of retrieved secondary applications;
   restricting, by the application execution container, all network communications by the executed secondary application to the secure network connection between the application execution container and the application gateway node;
   providing, by the application execution container, an authentication interface to authenticate the user of the application execution container to the application gateway node over the secure network connection to allow the executed secondary application access to the application gateway node,
   wherein the authentication interface authenticates the user of the application execution container to the application gateway node by providing secure authentication information of the user of the application execution container to the application gateway node without providing the secure authentication information of the user of the application execution container to the executed secondary application; and
   transforming, by the application execution container, a request for services from the application gateway node by the executed secondary application into an authenticated request to the application gateway node by using the provided authentication interface,
   wherein the authentication interface is configured to support multi-factor authentication with the application gateway node,
   wherein the secure authentication information of the user is provided by the application execution container within an encrypted object, and
   wherein the encrypted object is encrypted so that the executed secondary application and the application execution container cannot decrypt the secure authentication information of the user.

2. The computer-implemented method of claim 1, wherein the plurality of secondary applications are configured so as to execute only within the application execution container.

3. The computer-implemented method of claim 1, wherein retrieving the plurality of secondary applications from the application gateway node comprises selecting secondary applications for retrieval based on selection criteria associated with the user of the application execution container.

4. The computer-implemented method of claim 3, wherein the selection criteria comprise selecting secondary applications based on services provided to the user of the application execution container by an external services provider.

5. The computer-implemented method of claim 1, further comprising creating a record of authenticated transactions between respective ones of the secondary applications executing within the application execution container and the application gateway node,
   wherein the record is stored in a non-transitory storage medium.

6. The computer-implemented method of claim 1, wherein the application execution container executes within an operating system of a personal computing device.

7. The computer-implemented method of claim 6, wherein the personal computing device is a phone.

8. The computer-implemented method of claim 1, wherein providing, by the application execution container, the authentication interface comprises providing a computing interface configured to exchange data between the executed secondary application and the application gateway node, over the secure network connection.

9. The computer-implemented method of claim 1, wherein the authentication interface requires the multi-factor authentication responsive to selected transactions initiated by the executed secondary application.

10. The computer-implemented method of claim 1, further comprising:

providing, by the application execution container, a data exchange interface configured to exchange data between a first executed secondary application and a second executed secondary application.

11. The computer-implemented method of claim 1, wherein an access to services provided by an external services provider to the executed secondary application is restricted responsive to a level of service allowed to the user of the application execution container.

12. The computer-implemented method of claim 11, wherein an access to services provided by the external services provider to the executed secondary application is further restricted responsive to a level of service allowed to the executed secondary application.

13. The computer-implemented method of claim 1, further comprising:
   receiving, by the application gateway node, an external connector module from an external services provider, wherein the external connector module is configured to communicate data between the application gateway node and the external services provider;
   providing, by the application gateway node, a secure network connection between the application gateway node and the external services provider;
   receiving a request, at the application gateway node from the executed secondary application, for the executed secondary application to communicate with the external services provider; and
   routing the request, by the application gateway node, from the executed secondary application to the external services provider through the external connector module.

14. The computer-implemented method of claim 1, wherein respective ones of the plurality of the secondary applications retrieved from the application gateway node are coded in HTML and/or JavaScript®.

15. The computer-implemented method of claim 1, wherein the retrieved plurality of secondary applications are stored and executed only from within a volatile storage medium on the computing device.

16. The computer-implemented method of claim 1, wherein the authentication interface comprises a common set of procedures and/or objects managed by the application execution container and shared among the retrieved secondary applications.

17. A system, comprising:
   a processor; and
   a memory coupled to the processor and comprising computer readable program code embodied in the memory that when executed by the processor causes the processor to perform operations comprising:
      displaying, on the system, an application execution container configured to provide an execution environment to execute secondary applications within the application execution container;
      providing, by the application execution container, a secure network connection over a computer network between the secondary applications and an application gateway node;
      retrieving, by the application execution container, a plurality of secondary applications from the application gateway node over the secure network connection;
      executing, within the application execution container and responsive to selection by a user of the application execution container, one of the plurality of retrieved secondary applications;
      restricting, by the application execution container, all network communications by the executed secondary application to the secure network connection between the application execution container and the application gateway node;
      providing, by the application execution container, an authentication interface to authenticate the user of the application execution container to the application gateway node over the secure network connection to allow the executed secondary application access to the application gateway node,
         wherein the authentication interface authenticates the user of the application execution container to the application gateway node by providing secure authentication information of the user of the application execution container to the application gateway node without providing the secure authentication information of the user of the application execution container to the executed secondary application; and
      transforming, by the application execution container, a request for services from the application gateway node by the executed secondary application into an authenticated request to the application gateway node by using the provided authentication interface,
   wherein the authentication interface is configured to support multi-factor authentication with the application gateway node,
   wherein the secure authentication information of the user is provided by the application execution container within an encrypted object, and
   wherein the encrypted object is encrypted so that the executed secondary application and the application execution container cannot decrypt the secure authentication information of the user.

18. The system of claim 17, wherein the plurality of secondary applications are configured so as to execute only within the application execution container.

19. The system of claim 18, wherein retrieving the plurality of secondary applications from the application gateway node comprises selecting secondary applications for retrieval based on selection criteria associated with the user of the application execution container.

20. The system of claim 19, wherein the selection criteria comprise selecting secondary applications based on services provided to the user of the application execution container by an external services provider.

21. The system of claim 17, wherein providing, by the application execution container, the authentication interface comprises providing a computing interface configured to exchange data between the executed secondary application and an external services provider, over the secure network connection.

22. The system of claim 17, wherein the authentication interface requires the multi-factor authentication responsive to selected transactions initiated by the executed secondary application.

23. A system, comprising:
   a processor; and
   a memory coupled to the processor and comprising computer readable program code embodied in the memory that when executed by the processor causes the processor to perform operations comprising:
      receiving, on the system, a request from an application execution container configured to provide a secure network connection over a computer network between the system and the application execution container;

receiving, over the secure network connection between the system and the application execution container, user authentication information associated with a user of the application execution container;

performing multi-factor authentication of the user of the application execution container;

providing the received user authentication information to an authentication and privileges engine, wherein the authentication and privileges engine is configured to associate the user authentication information with entitlements available to the user;

receiving from the authentication and privileges engine a plurality of entitlements associated with the user of the application execution container;

responsive to receiving the plurality of entitlements of the user associated with the application execution container, determining a plurality of entitled secondary applications which the plurality of entitlements of the user indicate are available for the user, wherein respective ones of the plurality of entitled applications comprise a user interface portion and a functional portion;

receiving, over the secure network connection between the system and the application execution container, a first request for the user interface portion of a respective one of the plurality of entitled applications;

providing, responsive to the first request, the user interface portion of the respective one of the plurality of the entitled secondary applications over the secure network connection to the application execution container;

receiving, over the secure network connection between the system and the application execution container, a second request for the functional portion of the respective one of the plurality of entitled applications; and providing, responsive to the second request, the functional portion of the respective one of the plurality of the entitled secondary applications over the secure network connection to the application execution container, wherein the user authentication information associated with the user of the application execution container is received within an encrypted object, and wherein the encrypted object is encrypted so that the plurality of entitled secondary applications and the application execution container cannot decrypt the user authentication information of the user.

24. A computer program product, comprising:

a non-transitory computer readable storage medium having computer readable program code embodied in the medium that when executed by a processor causes the processor to perform operations comprising:

displaying, on a computing device, an application execution container configured to provide an execution environment to execute secondary applications within the application execution container;

providing, by the application execution container, a secure network connection over a computer network between the secondary applications and an application gateway node;

retrieving, by the application execution container, a plurality of secondary applications from the application gateway node over the secure network connection;

executing, within the application execution container and responsive to selection by a user of the application execution container, one of the plurality of retrieved secondary applications;

restricting, by the application execution container, all network communications by the executed secondary application to the secure network connection between the application execution container and the application gateway node;

providing, by the application execution container, an authentication interface to authenticate the user of the application execution container to the application gateway node over the secure network connection to allow the executed secondary application access to the application gateway node, wherein the authentication interface authenticates the user of the application execution container to the application gateway node by providing secure authentication information of the user of the application execution container to the application gateway node without providing the secure authentication information of the user of the application execution container to the executed secondary application; and transforming, by the application execution container, a request for services from the application gateway node by the executed secondary application into an authenticated request to the application gateway node by using the provided authentication interface, wherein the authentication interface is configured to support multi-factor authentication with the application gateway node, wherein the secure authentication information of the user is provided by the application execution container within an encrypted object, and wherein the encrypted object is encrypted so that the executed secondary application and the application execution container cannot decrypt the secure authentication information of the user.

25. The computer program product of claim 24, wherein the plurality of secondary applications are configured so as to execute only within the application execution container.

26. The computer program product of claim 24, wherein retrieving the plurality of secondary applications from the application gateway node comprises selecting secondary applications for retrieval based on selection criteria associated with the user of the application execution container.

27. The computer program product of claim 21, wherein providing, by the application execution container, the authentication interface comprises providing a computing interface configured to exchange data between the executed secondary application and the application gateway node, over the secure network connection.

* * * * *

UNITED STATES PATENT AND TRADEMARK OFFICE
CERTIFICATE OF CORRECTION

PATENT NO. : 9,641,529 B2
APPLICATION NO. : 14/937078
DATED : May 2, 2017
INVENTOR(S) : Kovacs et al.

Page 1 of 1

It is certified that error appears in the above-identified patent and that said Letters Patent is hereby corrected as shown below:

In the Claims

Column 38, Claim 27, Line 55: Please correct "product of claim 21," to read -- product of claim 24 --

Signed and Sealed this
Sixth Day of March, 2018

Andrei Iancu
*Director of the United States Patent and Trademark Office*